United States Patent
Minamikawa et al.

(10) Patent No.: US 8,812,203 B2
(45) Date of Patent: Aug. 19, 2014

(54) CONTROL APPARATUS FOR VEHICULAR POWER TRANSMITTING SYSTEM

(75) Inventors: Koki Minamikawa, Toyota (JP); Yoshiki Ando, Anjo (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/321,431

(22) PCT Filed: Nov. 10, 2009

(86) PCT No.: PCT/JP2009/069135
§ 371 (c)(1),
(2), (4) Date: Nov. 18, 2011

(87) PCT Pub. No.: WO2010/134224
PCT Pub. Date: Nov. 25, 2010

(65) Prior Publication Data
US 2012/0072065 A1    Mar. 22, 2012

(30) Foreign Application Priority Data
May 19, 2009   (JP) .............................. 2009-121151

(51) Int. Cl.
G06F 19/00     (2011.01)
B60L 11/00     (2006.01)

(52) U.S. Cl.
USPC ............................................ 701/55; 701/22

(58) Field of Classification Search
USPC ........ 701/22, 51, 55, 70; 477/37, 6, 115, 125, 477/5; 303/152
See application file for complete search history.

(56) References Cited

U.S. PATENT DOCUMENTS 5,857,755 A * 1/1999 Aoki et al. ................... 303/152
6,319,168 B1 * 11/2001 Morris et al. ..................... 477/5

(Continued)

FOREIGN PATENT DOCUMENTS

JP    2002 323070    11/2002
JP    2003 182405    7/2003

(Continued)

OTHER PUBLICATIONS

International Search Report Issued Feb. 9, 2010 in PCT/JP09/069135 Filed Nov. 10, 2009.

(Continued)

Primary Examiner — Calvin Cheung
Assistant Examiner — Aaron L Troost
(74) Attorney, Agent, or Firm — Oblon, Spivak, McClelland, Maier & Neustadt, L.L.P.

(57) ABSTRACT

A control apparatus for a power transmitting system of a vehicle provided with a transmission portion having a plurality of speed ratios to be established in steps, and an electric motor operatively connected to an input-side rotary member of said transmission portion and controlled to generate a regenerative torque in a decelerating state of the vehicle, the control apparatus is configured: to implement a shifting control to perform a shifting operation of said transmission portion under the condition of a determination in the decelerating state of the vehicle that an input torque of said transmission portion including said regenerative torque is substantially zero; and to implement the shifting control to perform the shifting operation of said transmission portion under the condition of an improvement of a fuel economy rather than the determination that the input torque of said transmission portion is substantially zero, when a target deceleration value of the vehicle is larger than a predetermined threshold value.

14 Claims, 11 Drawing Sheets

(56) References Cited

U.S. PATENT DOCUMENTS

| | | |
|---|---|---|
| 2002/0147530 A1* | 10/2002 | Tamagawa et al. ............. 701/22 |
| 2005/0054480 A1* | 3/2005 | Ortmann et al. .................. 477/6 |
| 2006/0166784 A1* | 7/2006 | Tabata et al. .................... 477/37 |
| 2007/0066444 A1* | 3/2007 | Matsudaira et al. .......... 477/115 |
| 2007/0270277 A1* | 11/2007 | Ortmann et al. .................. 477/5 |
| 2008/0176708 A1* | 7/2008 | Tamai et al. ................. 477/125 |
| 2008/0255716 A1* | 10/2008 | Bandai et al. .................... 701/22 |
| 2008/0312029 A1 | 12/2008 | Matsubara et al. |
| 2009/0118949 A1 | 5/2009 | Heap et al. |
| 2010/0049387 A1* | 2/2010 | Aoki ............................... 701/22 |

FOREIGN PATENT DOCUMENTS

| | | |
|---|---|---|
| JP | 2008 207690 | 9/2008 |
| JP | 2008 290582 | 12/2008 |

OTHER PUBLICATIONS

Japanese Office Action Issued Jul. 5, 2011 in Japanese Patent Application No. 2009-121151 Filed May 19, 2009 (with partial English translation).

* cited by examiner

|  | C1 | C2 | C3 | B1 | B2 | F1 | SPEED RATIO | STEPPING RATIO |
|---|---|---|---|---|---|---|---|---|
| 1st | O |  |  |  | (O) | O | 3.20 | |
|  |  |  |  |  |  |  |  | 1.86 |
| 2nd | O |  |  | O |  |  | 1.72 | |
|  |  |  |  |  |  |  |  | 1.72 |
| 3rd | O | O |  |  |  |  | 1.00 | |
|  |  |  |  |  |  |  |  | 1.49 |
| 4th |  | O |  | O |  |  | 0.67 | |
| Rev |  |  | O |  | O |  | 2.04 | SPREAD |
|  |  |  |  |  |  |  |  | 4.76 |
| N |  |  |  |  |  |  |  | |

CONTROL APPARATUS FOR VEHICULAR POWER TRANSMITTING SYSTEM

TECHNICAL FIELD

The present invention relates to a control apparatus for a vehicular power transmitting system provided with an electric motor operatively connected to an input-side rotary member of a transmission portion, and more particularly to techniques for applying a braking force to a vehicle by implementing a regenerative control of the electric motor during a coasting run of the vehicle.

BACKGROUND ART

There is well known a power transmitting system of a vehicle provided with an electric motor operatively connected to an input-side rotary member of a transmission portion. Patent Documents 1 and 2 disclose examples of such a vehicular power transmitting system. In the vehicular power transmitting system disclosed in the Patent Document 1, the transmission portion is shifted according to predetermined shifting lines representative of variables in the form of an required vehicle output amount (such as an accelerator operation amount or a required output torque) and a running speed of the vehicle. This document also discloses a regenerative control of the electric motor for the purpose of improving energy efficiency (fuel economy) during a coating run of the vehicle.

PRIOR ART DOCUMENTS

Patent Documents

Patent Document 1: JP-2008-207690 A
Patent Document 2: JP-2002-323070 A

SUMMARY OF THE INVENTION

Object to be Achieved by the Invention

In the vehicular power transmitting system disclosed in the above-identified Patent Document 1, a coasting shift-down operation of the transmission portion is performed when a point representative of the variables has moved across a shift-down line during the coasting run. During the coasting run wherein a regenerative torque of the electric motor is input to the transmission portion, a shifting operation of the transmission portion while the regenerative torque of the electric motor is input thereto may possibly cause a shifting shock. To reduce this shifting shock, the transmission portion is shifted in a well known clutch-to-clutch shifting fashion. Alternatively, the transmission portion may be shifted so as to attain synchronization of the rotating speed of the input-side rotary member of the transmission portion before and after the shifting operation, by controlling the electric motor in free states of clutches in the form of a releasing-side coupling device and an engaging-side coupling device of the transmission portion in which the coupling devices are both placed in their released states. In the case of this shifting operation in the above-indicated clutch free states, a change of the input torque of the transmission portion in the clutch free states established by the synchronous control by the electric motor does not influence the output torque, and does not involve a torque transfer as caused in the clutch-to-clutch shifting operation, eliminating a complicated control required in the clutch-to-clutch shifting operation. However, the shifting operation in the clutch free states may have a risk of an increase of the shifting shock where the input torque of the transmission portion is large, since the input torque transmitted to the output side of the transmission portion is increased in steps upon completion of the shifting operation effected by termination of the clutch free states. In view of a determination to perform the coasting shift-down operation in an off state of the accelerator depending solely upon whether the vehicle running speed has been lowered below a predetermined point of the coasting shift-down operation, it is considered to predetermine this point of the coasting shift-down operation so as to be a vehicle condition in which the above-indicated shifting shock is reduced.

By the way, the vehicle is braked during the coasting run, with a braking force (braking torque) consisting of a regenerative torque and/or a wheel braking torque produced by a wheel braking system, so as to achieve a target value of deceleration of the vehicle determined according to the vehicle running speed and an operating force (e.g., depression force) of a brake operating member during the coasting run, for example. For instance, the vehicle is braked with only the regenerative torque in the off state of the brake operating member, and with both of the regenerative torque and the wheel braking torque in an on state of the brake operating member. In this case, the wheel braking torque is increased to achieve the target vehicle deceleration value which increases with an increase of an operation amount of the brake operating member, and the regenerative torque is also increased for the purpose of improving the fuel economy and so that the regenerative torque shares a predetermined proportion of the total braking torque determined by the target vehicle deceleration value. Accordingly, the regenerative torque, that is, the input torque of the transmission portion at the same vehicle running speed may vary depending upon the operation amount of the brake operating member. If the above-indicated point of the vehicle running speed at which the coasting shift-down operation is performed is fixed, the input torque of the transmission portion upon the shift-down operation may vary depending upon the operation amount of the brake operating member, giving rise to a risk of an increase of the shifting shock due to an increase of the output torque of the transmission portion upon completion of the shift-down operation. In this respect, it is noted that the problem described above is not known in the art, and it has not yet been proposed to perform a coasting shift-down operation of the transmission portion at an adequate timing so as to reduce the shifting shock.

The present invention was made in view of the background art described above. It is an object of this invention to provide a control apparatus for a power transmitting system of a vehicle provided with a transmission portion having a plurality of speed ratios to be established in steps, and an electric motor operatively connected to an input-side rotary member of the transmission portion, which control apparatus permits a coasting shift-down operation of the transmission portion to be performed at an adequate timing so as to reduce a change of an input torque of the transmission portion during the coasting shift-down operation for thereby reducing a shifting shock of the transmission portion.

Means for Achieving the Object

The object indicated above can be achieved according to the present invention, which provides a control apparatus (a) for a power transmitting system of a vehicle provided with a transmission portion having a plurality of speed ratios to be established in steps, and an electric motor operatively connected to an input-side rotary member of the transmission portion and controlled to generate a regenerative torque in a decelerating state of the vehicle, (b) the control apparatus being characterized to implement a shifting control to perform a shifting operation of the above-described transmission portion under the condition of a determination in the decelerating state of the vehicle that an input torque of said transmission portion including the above-described regenerative torque is substantially zero.

Advantages of the Invention

The control apparatus described above is configured to implement the shifting control to perform the shifting operation of the transmission portion under the condition of the determination in the decelerating state of the vehicle that the input torque of the transmission portion including the regenerative torque generated by the electric motor is substantially zero. Therefore, the input torque of the transmission portion is determined to be substantially zero when a coasting shift-down operation of the transmission portion, for example, is performed, so that the amount of change of the output torque of the transmission portion upon completion of the coasting shift-down operation can be minimized. Since the shifting operation of the transmission portion is performed when it is determined that the input torque is substantially zero, as described above, the amount of change of the input torque of the transmission portion upon the shifting operation is reduced, so that the shifting shock is reduced.

The control apparatus is preferably configured to provide a predetermined value of the above-described regenerative torque used to determine whether the input torque of the above-described transmission portion is substantially zero, and to determine whether the input torque of the above-described transmission portion is substantially zero, by determining whether the regenerative torque is equal to the predetermined value. Thus, the determination as to whether the input torque of the transmission portion is substantially zero can be adequately made, and the shifting operation of the transmission portion is performed when the input torque is substantially zero.

The control apparatus is also preferably configured to provide a predetermined shifting point at which the shifting operation of the above-described transmission portion should be performed while the input torque of the above-described transmission portion is substantially zero, and to determine whether the input torque of the above-described transmission portion is substantially zero, by determining whether a point representative of a running state of the vehicle coincides with the above-described predetermined shifting point. Thus, the determination as to whether the input torque of the transmission portion is substantially zero is adequately made, so that the shifting operation of the transmission portion is adequately performed when the input torque of the transmission portion is substantially zero.

Where the vehicle is provided with a braking system for applying a wheel braking torque to each wheel, the control apparatus is preferably configured to apply a braking force to the vehicle to achieve a target deceleration value of the vehicle, with the above-described wheel braking torque in addition to the above-described regenerative torque, and to set the above-described shifting point at which the input torque of the above-described transmission portion is substantially zero, such that the shifting point to be used when only the above-described regenerative torque is applied to the vehicle is lowered by an amount corresponding to an amount of increase of the target deceleration value. Accordingly, the shifting operation of the transmission portion is more adequately performed when the input torque of the transmission portion is substantially zero.

The control apparatus is also preferably configured to, in process of the shifting operation, implement a shifting synchronization control to place a power transmitting path through the above-described transmission portion in a power cut-off state, and to control the above-described electric motor for controlling a rotating speed of an input-side rotary member of the above-described transmission portion to synchronize with a speed value to be established after the shifting operation, during a process of the shifting operation of the transmission portion. Unlike a clutch-to-clutch shifting control, for example, the shifting synchronization control (synchronous control of the torque of the electric motor, for instance) prevents a change of the input torque of the transmission portion from influencing the output torque in the process of the shifting operation, and is comparatively easily implemented to perform the shifting operation of the transmission portion. In addition, if the shifting operation of the transmission portion is performed as described above, the amount of change of the output torque of the transmission portion upon completion of the coasting shift-down operation performed under the shifting synchronization control can be minimized, so that the shifting shock can be minimized.

The control apparatus is also preferably configured to implement the shifting control to perform the shifting operation of the above-described transmission portion under the condition of an improvement of the fuel economy rather than the determination that the input torque of the above-described transmission portion is substantially zero, when a target deceleration value of the vehicle is larger than a predetermined value. Thus, the control priority is given to the fuel economy, to improve the fuel economy rather than to reduce the shifting shock, when the vehicle deceleration value is relatively large so that the shifting shock is less likely to be felt by the vehicle operator than when the vehicle deceleration value is relatively small.

The control apparatus is also preferably configured to implement the shifting control to perform the shifting operation of the above-described transmission portion, so as to maximize the regeneration efficiency of the above-described electric motor. Accordingly, the shifting operation of the transmission portion is adequately performed under the condition of the improvement of the fuel economy.

Preferably, the power transmitting system is further provided with a differential portion operatively connected to an engine, and the above-described transmission portion constitutes a portion of a power transmitting path between the above-described engine and drive wheels. In this practical arrangement of the vehicular power transmitting system provided with the engine, differential portion, transmission portion and electric motor, the control apparatus implements the shifting control to perform the shifting operation of the transmission portion when it is determined that the input torque of the transmission portion is substantially zero, so that the amount of change of the input torque of the transmission portion in the shifting operation is reduced to reduce the shifting shock of the transmission portion.

Preferably, the above-described differential portion has a differential mechanism operatively connected to the above-described engine, and a differential-portion electric motor operatively connected to the differential mechanism, and is operable as an electric continuously-variable transmission, with a differential state of the differential mechanism being controlled by controlling an operating state of the differential-portion electric motor. In this practical arrangement of the vehicular power transmitting system provided with the differential portion functioning as the electric continuously-variable transmission, the control apparatus implements the shifting control to perform the shifting operation of the transmission portion when it is determined that the input torque of the transmission portion is substantially zero, so that the amount of change of the input torque of the transmission portion in the shifting operation is reduced to reduce the shifting shock of the transmission portion. Further, a drive torque to be generated by the differential portion can be smoothly changed. It is noted that the differential portion, which is operable as the electric continuously-variable transmission the speed ratio of which is continuously variable, is also operable as a step-variable transmission the speed ratio of which is variable in steps.

Preferably, the above-described transmission portion is a step-variable transmission having speed ratios to be mechanically established. In this practical arrangement of the vehicular power transmitting system provided with the step-variable transmission (transmission portion) having a plurality of shift positions to be established in steps, the control apparatus implements the shifting control to perform the shifting operation of the transmission portion when it is determined that the input torque of the transmission portion is substantially zero, so that the amount of change of the input torque of the transmission portion in the shifting operation is reduced to reduce the shifting shock of the transmission portion.

Preferably, the above-described step-variable transmission is constituted by one of various configurations of a planetary gear type multi-step transmission, which includes a plurality of planetary gear sets rotary elements of which are selectively connected to each other through frictional coupling devices to selectively establish a plurality of gear positions (shift positions), for example, four, five, six or more forward-drive shift positions. The frictional coupling devices of this planetary gear type multi-step transmission may be commonly used hydraulically operated frictional coupling devices such as multiple-disc or single-disc clutches and brakes, or belt-type brakes which are engaged by a hydraulic actuator. An oil pump for delivering a working oil for operating the hydraulically operated frictional coupling devices may be driven by the vehicle drive power source (engine), or by an electric motor provided exclusively for driving the oil pump, in addition to the vehicle drive power source. The clutches or brakes may be electromagnetic coupling devices such as electro-magnetic clutches or magnetic-powder clutches, in place of the hydraulically operated frictional coupling devices.

Preferably, a hydraulic control unit incorporating the above-described hydraulically operated frictional coupling devices is preferably arranged to apply output hydraulic pressures of linear solenoid valves, for example, directly to respective hydraulic actuators (hydraulic cylinders) of the hydraulically operated frictional coupling devices, from the standpoint of the operating response of the frictional coupling devices. However, the output hydraulic pressures of the linear solenoid valves may be used as pilot hydraulic pressures to be applied to respective shift control valves the output hydraulic pressures of which are applied to the hydraulic actuators.

Preferably, the above-described linear solenoid valves are provided for the respective ones of the plurality of hydraulically operated frictional coupling devices. However, various other valve arrangements may be employed. Where those hydraulically operated frictional coupling devices do not include a plurality of hydraulically operated frictional coupling devices that are simultaneously engaged, or engaged and released, for example, a common linear solenoid valve may be provided for those plurality of frictional coupling devices. All of the hydraulically operated frictional coupling devices are not necessarily controlled by the linear solenoid valves, and some of the frictional coupling devices may be controlled by pressure regulating means other than the linear solenoid valves, for instance, by ON-OFF solenoid valves the duty ratios of which are controllable. The expression "to apply hydraulic pressures to . . . . " used in the present specification is interpreted to mean "to cause the hydraulic pressure to act on . . . . " or "to supply the working oil having the hydraulic pressures to . . . . ".

Preferably, the above-described differential mechanism is a device having three rotary elements consisting of a first rotary element connected to the above-described engine, a second rotary member connected to the above-described differential-portion electric motor, and a third rotary element connected to the above-described vehicle drive power source. In this practical arrangement of the vehicle transmitting system, the differential mechanism is simply composed.

Preferably, the above-described differential mechanism is a single-pinion type planetary gear set which has a carrier serving as the above-described first rotary element, a sun gear serving as the above-described second rotary element, and a ring gear serving as the above-described third rotary element. In this case, the above-described differential mechanism can have a reduced axial dimension, and is simple in construction with a single planetary gear set of the single-pinion type.

MODES FOR CARRYING OUT THE INVENTION

Embodiments of the present invention will be described in detail by reference to the drawings.

Embodiment 1

Figure 1:
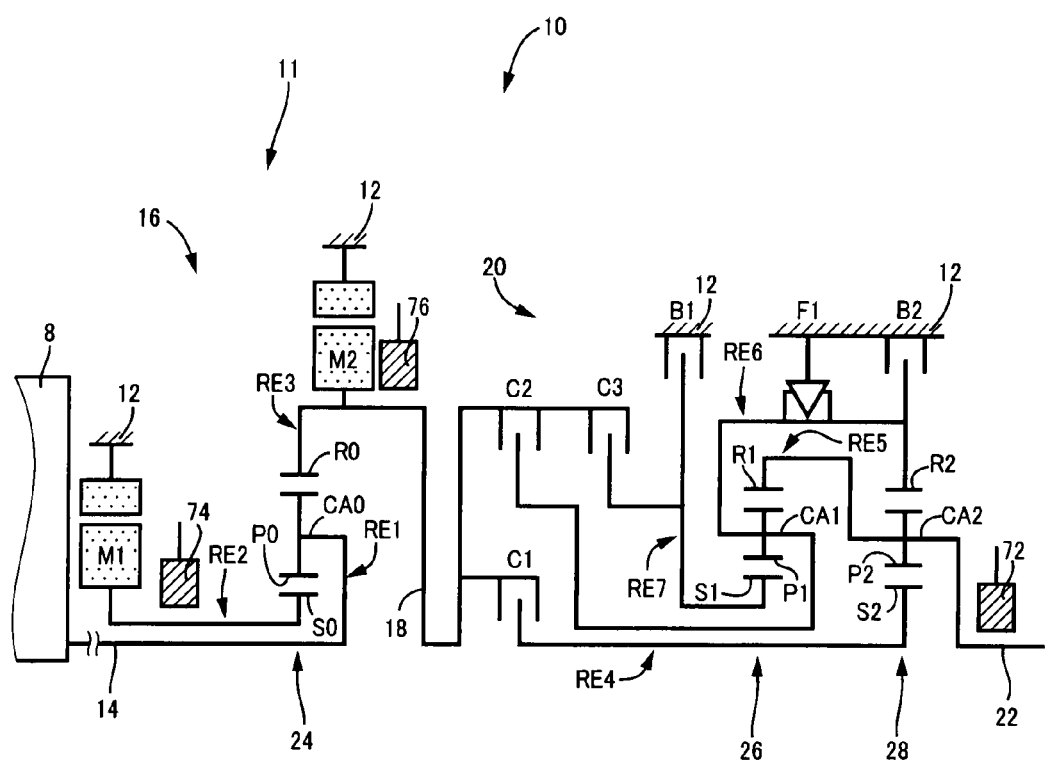
FIG. 1 is a schematic view for explaining an arrangement of a vehicular power transmitting system to which a control apparatus according to the present invention is applicable.

FIG. 1 is the schematic view showing a vehicular power transmitting system 10 (hereinafter referred to as "power transmitting system 10") to which the control apparatus according to the present invention is applicable. This power transmitting system 10 is suitably used for a hybrid vehicle. As shown in FIG. 1, the power transmitting system 10 includes: an input rotary member in the form of an input shaft 14; a continuously-variable transmission portion in the form of a differential portion 11 connected to the input shaft 14 either directly, or indirectly via a pulsation absorbing damper (vibration damping device) not shown; a power transmitting portion in the form of an automatic transmission portion 20 disposed in a power transmitting path between the differential portion 11 and drive wheels 34 (shown in FIG. 7) and connected in series via a power transmitting member 18 to the differential portion 11 and the drive wheels 34; and an output rotary member in the form of an output shaft 22 connected to the automatic transmission portion 20. The input shaft 14, differential portion 11, automatic transmission portion 20 and output shaft 22 are coaxially disposed on a common axis in a transmission casing 12 (hereinafter referred to as "casing 12") functioning as a stationary member attached to a body of the vehicle, and are connected in series with each other. This power transmitting system 10 is suitably used for a longitudinal FR vehicle (front-engine, rear-drive vehicle), and is disposed between a vehicle drive power source in the form of an internal combustion engine 8 and the pair of drive wheels 34, to transmit a drive power force from the engine 8 to the pair of drive wheels 34 through a differential gear device (final speed reduction gear) 32 (shown in FIG. 7) and a pair of drive axles, each of which constitutes a part of the power transmitting path. The engine 8 may be a gasoline engine or diesel engine, for example, and functions as a vehicle drive power source connected to the input shaft 14 directly, or via the pulsation absorbing damper not shown.

In the present power transmitting system 10 constructed as described above, the engine 8 and the differential portion 11 are directly connected to each other. This direct connection means that the engine 8 and the transmission portion 11 are connected to each other, without a fluid-operated power transmitting device such as a torque converter or a fluid coupling being disposed therebetween, but may be connected to each other through the pulsation absorbing damper as described above. It is noted that a lower half of the power transmitting system 10, which is constructed symmetrically with respect to its axis, is omitted in the schematic view of FIG. 1. This is true for each of the embodiments described below.

The differential portion 11, which functions as an electrically controlled differential portion, includes: a power distributing mechanism 16; a first electric motor M1 operatively connected to the power distributing mechanism 16 and functioning as a differential-portion electric motor for controlling a differential state of the power distributing mechanism 16; and a second electric motor M2 operatively connected to and rotated with the power transmitting member 18. The power transmitting member 18, which is an output-side rotary member of the differential portion 11, is also equivalent to an input-side rotary member of the automatic transmission portion 20.

Each of the first and second electric motors M1 and M2 is a so-called motor/generator having a function of a motor operable to convert an electric energy into a mechanical drive force, and a function of an electric generator operable to convert a mechanical drive force into an electric energy. In other words, the electric motors M can operate in place of a main drive power source in the form of the engine 8, or can function as a drive power source (auxiliary drive power source) operable together with the engine 8 to generate a vehicle drive power source. Each of the electric motors M also operates to regenerate an electric energy from a drive force generated by other drive power sources, so that the regenerated electric energy is supplied to the other electric motor M through an inverter 54 (shown in FIG. 7), or stored in an electric-energy storage device 56 (shown in FIG. 7).

The first electric motor M1 has at least the function of the generator (electric generator) operable to generate a reaction force, while the second electric motor M2 has at least the function of the motor (electric motor) functioning as a vehicle drive power source serving as a second vehicle drive power source operable to generate a vehicle drive force. Preferably, each of the first electric motor M1 and the second electric motor M2 is configured such that an amount of electric energy which the motor M operating as the electric motor can generate is continuously variable. The first electric motor M1 and the second electric motor M2 are disposed within the casing 12 serving as the housing of the power transmitting system 10, and are cooled by a working oil of the automatic transmission portion 20, which is a working fluid of the power transmitting system 10.

The power distributing mechanism 16 is a differential mechanism operatively connected to the engine 8, and is principally constituted by a differential-portion planetary gear set 24 of a single pinion type having a predetermined gear ratio $\rho 0$ of about 0.416, for example. The power distributing mechanism 16 is a mechanism configured to mechanically distribute an output of the engine 8 received through the input shaft 14. The differential-portion planetary gear set 24 has rotary elements (elements) consisting of: a differential-portion sun gear S0, a differential-portion planetary gear P0; a differential-portion carrier CA0 supporting the differential-portion planetary gear P0 such that the differential-portion planetary gear P0 is rotatable about its axis and about the axis of the differential-portion sun gear S0; and a differential-portion ring gear R0 meshing with the differential-portion sun gear S0 through the differential-portion planetary gear P0. Where the numbers of teeth of the differential-portion sun gear S0 and the differential-portion ring gear R0 are represented by ZS0 and ZR0, respectively, the above-indicated gear ratio ρ0 is represented by ZS0/ZR0.

In the power distributing mechanism 16, the differential-portion carrier CA0 is connected to the input shaft 14, that is, to the engine 8, and the differential-portion sun gear S0 is connected to the first electric motor M1, while the differential-portion ring gear R0 is connected to the power transmitting member 18. The power distributing mechanism 16 constructed as described above is placed in a differentially operable state (differential state) in which three elements of the planetary gear set 24 consisting of the differential-portion sun gear S0, differential-portion carrier CA0 and differential-portion ring gear R0 are rotatable relative to each other. In the differential state, the output of the engine 8 is distributed to the first electric motor M1 and the power transmitting member 18, whereby a portion of the output of the engine 8 is used to drive the first electric motor M1 to generate an electric energy which is stored or used to drive the second electric motor M2. Namely, the differential portion 11 (power distributing mechanism 16) functions as an electric differential device, which is operable in a continuously-variable shifting state (electrically established CVT state) in which the rotating speed of the power transmitting member 18 is continuously variable, irrespective of the operating speed of the engine 8. Namely, when the power distributing mechanism 16 is placed in the differential state, then the differential portion 11 is also placed in the differential state. The differential portion 11 is placed in continuously variable transmission mode in which the differential portion 11 performs as electrically controlled continuously variable transmission, in which a speed ratio γ0 (rotating speed $N_{IN}$ of the input shaft 14/rotating speed $N_{18}$ of the power transmitting member 18) of the differential portion 11 is continuously variable from a minimum value γ0min to a maximum value γ0max. In the differential state of the power distributing mechanism 16, the differential state of the power distributing mechanism 16, that is, a differential state between the rotating speed of the input shaft 14 and the rotating speed of the power transmitting member 18 is controlled by controlling one of both of the operating states (operating point) of the first and second electric motors M1 and M2 that are operatively connected to the power distributing mechanism 16 (differential portion 11).

The automatic transmission portion 20 (transmission portion) constitutes a part of a power transmitting path from the engine 8 to the drive wheels 34, and is provided with a single-pinion type first planetary gear set 26 and a single-pinion type second planetary gear set 28. The automatic transmission portion 20 is a planetary gear type multi-step transmission functioning as a step-variable automatic transmission having a plurality of speed ratios that are mechanically established in steps. The first planetary gear set 26 has: a first sun gear S1; a first planetary gear P1; a first carrier CA1 supporting the first planetary gear P1 such that the first planetary gear P1 is rotatable about its axis and about the axis of the first sun gear S1; and a first ring gear R1 meshing with the first sun gear 51 through the first planetary gear P1. For example, the first planetary gear set 26 has a predetermined gear ratio ρ1 of about 0.488. The second planetary gear set 28 has: a second sun gear S2; a second planetary gear P2; a second carrier CA2 supporting the second planetary gear P2 such that the second planetary gear P2 is rotatable about its axis and about the axis of the second sun gear S2; and a second ring gear R2 meshing with the second sun gear S2 through the second planetary gear P2. For example, the second planetary gear set 28 has a predetermined gear ratio ρ2 of about 0.455. Where the numbers of teeth of the first sun gear S1, first ring gear R1, second sun gear S2 and second ring gear R2 are represented by ZS1, ZR1, ZS2 and ZR2, respectively, the above-indicated gear ratios ρ1 and ρ2 are represented by ZS1/ZR1 and ZS2/ZR2, respectively.

In the automatic transmission portion 20, the first sun gear S1 is connected to the power transmitting member 18 through a third clutch C3, and selectively fixed to the casing 12 through a first brake B1, and the first carrier CA1 and the second ring gear R2 are integrally fixed to each other connected to the power transmission member 18 through a second clutch C2 and selectively fixed to the casing 12 through a second brake B2. The first ring gear R1 and the second carrier CA2 are integrally fixed to each other and to the output shaft 22, and the second sung gear S2 is selectively connected to the power transmitting member 18 through a first clutch C1. The first carrier CA1 and the second ring gear R2 are connected to the stationary member in the form of the casing 12 through a one-way clutch F1, so that the first carrier CA1 and second ring gear R2 are permitted to rotate in the direction of operation of the engine 8, but are inhibited from rotating in the direction opposite to the direction of operation of the engine 8. Therefore, the first carrier CA1 and the second ring gear R2 function rotating elements impossible to rotate in the opposite direction.

Figures 2, 3:
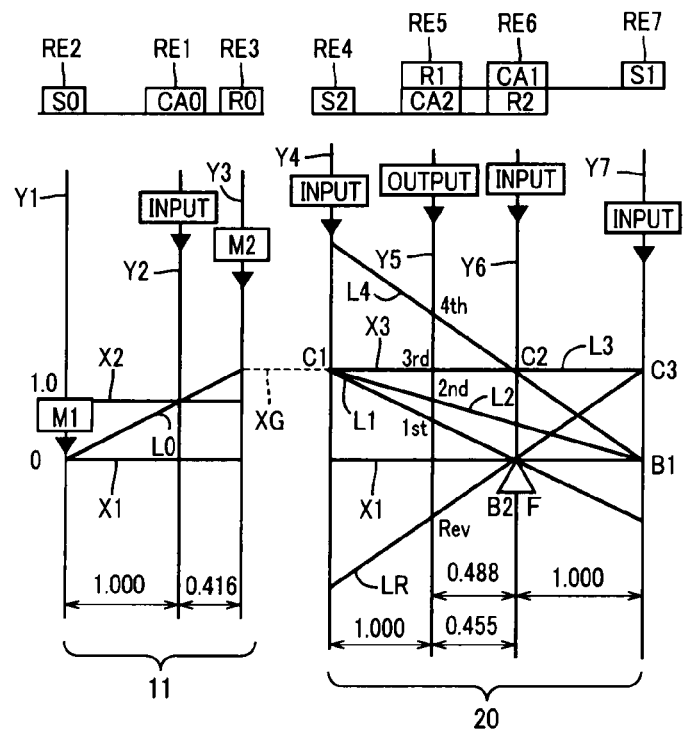
FIG. 2 is a table indicating shifting actions of an automatic transmission portion provided in the vehicular power transmitting system of FIG. 1, in relation to different combinations of operating states of hydraulically operated frictional coupling devices provided to effect the respective shifting actions.
FIG. 3 is a collinear chart indicating relative rotating speeds in different gear positions of the vehicular power transmitting system of FIG. 1.

The automatic transmission portion 20 constructed as described above is operable to perform a so-called "clutch-to-clutch" shifting action to establish a selected one of its plurality of gear positions (shift positions) by an engaging action of one of the coupling devices and a releasing action of another coupling device. The gear positions have respective speed ratios γ (rotating speed $N_{18}$ of the power transmitting member 18/rotating speed $N_{OUT}$ of the output shaft 22) which change as geometric series. As indicated in the table of FIG. 2, the first gear position having the speed ratio of about 3.20, for example, is established by an engaging actions of the first clutch C1 and one-way clutch F1, and the second gear position having the speed ratio of about 1.72, for example, is established by engaging actions of the first clutch C1 and first brake B1. The third gear position having the speed ratio of about 1.0, for example, is established by engaging actions of the first and second clutches C1 and C2 and the fourth gear position having the speed ratio of about 0.67, for example, is established by engaging actions of the second clutch C2 and first brake B1. The reverse gear position having the speed ratio of about 2.04, for example, is established by engaging actions of the third clutch C3 and the second brake B2, and the neutral position N is established when the first clutch C1, second clutch C2, third clutch C3, first brake B1 and second brake B2 are placed in the released state. An engine brake is applied to the vehicle in the first gear position when the second brake B2 is also engaged.

Thus, the power transmitting path through the automatic transmission portion 20 is switched between a power transmitting state for transmitting the vehicle drive force, and a power disconnecting state for inhibiting the transmission of the vehicle drive force, by appropriate combinations of the engaged and released states of the first clutch C1, second clutch C2, third clutch C3, first brake B1 and second brake B2. Namely, the above-indicated power transmitting path is placed in the power transmitting state when one of the first through four gear positions and the reverse gear position is established, and in the power disconnecting state when none of the gear positions are established, for example, when the neutral position N is established.

The above-described first clutch C1, second clutch C2, third clutch C3, first brake B1 and second brake B2 (hereinafter collectively referred to as clutches C and brakes B, unless otherwise specified) are hydraulically operated frictional coupling devices used as coupling elements in a conventional vehicular automatic transmission. Each of these frictional coupling devices is constituted by a wet-type multiple-disc clutch including a plurality of friction plates which are forced against each other by a hydraulic actuator, or a band brake including a rotary drum and one band or two bands which is/are wound on the outer circumferential surface of the rotary drum and tightened at one end by a hydraulic actuator. Each of the clutches C1-C3 and brakes B1, B2 is selectively engaged for connecting two members between which each clutch or brake is interposed.

In the power transmitting system 10 constructed as described above, the differential portion 11 functioning as the continuously-variable transmission and the automatic transmission portion 20 cooperate with each other to constitute a continuously-variable transmission. While the differential portion 11 is controlled to hold its speed ratio constant, the differential portion 11 and the automatic transmission portion 20 cooperate to function as a device equivalent to a step-variable transmission.

Described in detail, When the differential portion 11 functions as the continuously-variable transmission while the automatic transmission portion 20 connected in series to the differential portion 11 functions as the step-variable transmission, the speed of the rotary motion transmitted to the automatic transmission portion 20 placed in a selected one of the shift positions M (hereinafter referred to as "input speed of the automatic transmission portion 20"), namely, the rotating speed of the power transmitting member 18 (hereinafter referred to as "transmitting-member speed $N_{18}$") is continuously changed, so that the speed ratio when the automatic transmission portion 20 is placed in the selected shift position M is continuously variable over a predetermined range. Accordingly, an overall speed ratio $\gamma T$ of the power transmitting system 10 (rotating speed $N_{IN}$ of the input shaft 14/rotating speed $N_{OUT}$ of the output shaft 22) is continuously variable. Thus, the power transmitting system 10 as a whole is operable as a continuously-variable transmission. This overall speed ratio $\gamma T$ of the power transmitting system 10 is determined by the speed ratio $\gamma 0$ of the differential portion 11 and the speed ratio $\gamma$ of the automatic transmission portion 20. For example, the transmitting-member speed $N_{18}$ is continuously variable over the predetermined range when the automatic transmission portion 20 is placed in a selected one of the first through fourth gear positions and reverse gear position as indicated in the table of FIG. 2. Accordingly, the overall speed ratio $\gamma T$ of the power transmitting system 10 is continuously variable across the adjacent gear positions.

When the speed ratio of the differential portion 11 is held constant while the clutches C and brakes B are selectively engaged to establish the selected one of the first through fourth gear positions and the reverse gear position (reverse drive position), the overall speed ratio $\gamma T$ of the power transmitting system 10 is variable in steps as geometric series. Thus, the power transmitting system 10 is operable as a system equivalent to a step-variable transmission.

The collinear chart of FIG. 3 indicates, by straight lines, a relationship among the rotating speeds of the rotary elements in each of the gear positions of the power transmitting system 10, which is constituted by the differential portion 11 functioning as the continuously-variable transmission portion or a first transmission portion, and the automatic transmission portion 20 functioning as the step-variable transmission portion or a second transmission portion. The different gear positions correspond to respective different states of connection of the rotary elements. The collinear chart of FIG. 3 is a rectangular two-dimensional coordinate system in which the gear ratios $\rho$ of the planetary gear sets 24, 26 and 28 are taken along the horizontal axis, while the relative rotating speeds of the rotary elements are taken along the vertical axis. One of three horizontal lines, that is, a horizontal line X1 indicates the rotating speed of 0, while the horizontal line X2 located above the horizontal line X1 indicates the rotating speed of 1.0, that is, an operating speed $N_E$ of the engine 8 connected to the input shaft 14. The horizontal line XG (X3) indicates the rotating speed $N_{18}$ of the power transmitting member 18, that is, the rotating speed of a third rotary element RE3 described below, a rotary motion of which is transmitted from the differential portion 11 to the automatic transmission portion 20.

Three vertical lines Y1, Y2 and Y3 corresponding to the respective three elements of the power distributing mechanism 16 of the differential portion 11 respectively represent the relative rotating speeds of a second rotary element (second element) RE2 in the form of the differential-portion sun gear S0, a first rotary element (first element) RE1 in the form of the differential-portion carrier CA0, and the third rotary element (third element) RE3 in the form of the differential-portion ring gear R0. The distances between the adjacent ones of the vertical lines Y1, Y2 and Y3 are determined by the gear ratio $\rho 0$ of the differential-portion planetary gear set 24. Further, four vertical lines Y4, Y5, Y6 and Y7 corresponding to the automatic transmission portion 20 respectively represent the relative rotating speeds of a fourth rotary element (fourth element) RE4 in the form of the second sun gear S2, a fifth rotary element (fifth element) RE5 in the form of the first ring gear R1 and second carrier CA2 fixed to each other, a sixth rotary element (sixth element) RE6 in the form of the first carrier CA1 and second ring gear R2 fixed to each other, and a seventh rotary element (seventh element) RE7 in the form of the first sun gear S1. The distances between the adjacent ones of the vertical lines are determined by the gear ratios $\rho 1$ and $\rho 2$ of the first and second planetary gear sets 26 and 28. In the relationship among the vertical lines of the collinear chart, the distance between the sun gear and carrier of each planetary gear set corresponds to "1", while the distances between the carrier and ring gear of each planetary gear set corresponds to the gear ratio $\rho$. In the differential portion 11, the distance between the vertical lines Y1 and Y2 corresponds to "1", while the distance between the vertical lines Y2 and Y3 corresponds to the gear ratio $\rho 0$. In the automatic transmission portion 20, the distance between the sun gear and carrier of each of the first and second planetary gear sets 26 and 28 corresponds to "1", while the distance between the carrier and ring gear of each planetary gear set 26, 28 corresponds to the gear ratio $\rho$.

Referring to the above-indicated collinear chart of FIG. 3, the power distributing mechanism 16 (differential portion 11) of the power transmitting system 10 is arranged such that the first rotary element RE1 (differential-portion carrier CA0) of the differential-portion planetary gear set 24 is fixed to the input shaft 14, that is, to the engine 8, and the second rotary element RE2 is fixed to the first electric motor M1, while the third rotary element RE3 (differential-portion ring gear R0) is fixed to the power transmitting member 18 and the second electric motor M2, so that a rotary motion of the input shaft 14 is transmitted (input) to the automatic transmission portion 20 through the power transmitting member 18. A relationship between the rotating speeds of the differential-portion sun gear S0 and the differential-portion ring gear R0 is represented by an inclined straight line L0 which passes a point of intersection between the lines Y2 and X2.

In the differential state of the differential portion 11 in which the first through third rotary elements RE1-RE3 are rotatable relative to each other, for example, the rotating speed of the differential-portion carrier CA0, that is, the engine operating speed $N_E$, which is represented by a point of intersection between the straight line L0 and the vertical line Y2, is raised or lowered by controlling the operating speed of the first electric motor M1 such that the rotating speed of the differential-portion sun gear S0 represented by a point of intersection between the straight line L0 and the vertical line Y1 is raised or lowered, if the rotating speed of the differential-portion ring gear R0 represented by a point of intersection between the straight line L0 and the vertical line Y3 is substantially held constant at a value determined by the vehicle running speed V. When the rotating speed of the first electric motor M1 is controlled such that the speed ratio γ0 of the differential portion 11 is held at 1, so that the rotating speed of the differential-portion sun gear S0 is made equal to the engine speed $N_E$, the straight line L0 is aligned with the horizontal line X2, so that the differential-portion ring gear R0, that is, the power transmitting member 18 is rotated at the engine speed $N_E$. When the rotating speed of the first electric motor M1 is controlled such that the speed ratio γ0 of the differential portion 11 is held at a value lower than 1, for example at 0.7, on the other hand, so that the rotating speed of the differential-portion sun gear S0 is zeroed, the straight line L0 is inclined as indicated in FIG. 3, so that the power transmitting member 18 is rotated at a speed $N_{18}$ higher than the engine speed $N_E$.

In the automatic transmission portion 20, the fourth rotary element RE4 is selectively connected to the power transmitting member 18 through the first clutch C1, and the fifth rotary element RE5 is connected to the output shaft 22, while the sixth rotary element RE6 is selectively connected to the power transmitting member 18 through the second clutch C2 and selectively fixed to the transmission casing 12 through the second brake B2. The seventh rotary element RE7 is selectively connected to the power transmitting member 18 through the third clutch C3 and selectively fixed to the casing 12 through the first brake B1.

The automatic transmission portion 20 is placed in the first gear position when the first clutch C1 and the second brake B2 are engaged. The rotating speed of the output shaft 22 in the first gear position is represented by a point of intersection between a straight line L1 passing a point of intersection between the vertical line Y4 indicative of the rotating speed of the fourth rotary element RE4 and the horizontal line X3 and a point of intersection between the vertical line Y6 indicative of the rotating speed of the sixth rotary element RE6 and the horizontal line X1, and the vertical line Y5 indicative of the rotating speed of the fifth rotary element fixed to the output shaft 22, as indicated in FIG. 3. Similarly, the rotating speed of the output shaft 22 in the second gear position established by the engaging actions of the first clutch C1 and first brake B1 is represented by a point of intersection between a straight line L2 determined by those engaging actions, and the vertical line Y5 indicative of the rotating speed of the fifth rotary element RE5 fixed to the output shaft 22. The rotating speed of the output shaft 22 in the third gear position established by the engaging actions of the first clutch C1 and second clutch C2 is represented by a point of intersection between a straight line L3 determined by those engaging actions and the vertical line Y5 indicative of the rotating speed of the fifth rotary element RE5 fixed to the output shaft 22. The rotating speed of the output shaft 22 in the fourth gear position established by the engaging actions of the second clutch C2 and first brake B1 is represented by a point of intersection between a straight line L4 determined by those engaging actions and the vertical line Y5 indicative of the rotating speed of the fifth rotary element RE5 fixed to the output shaft 22.

Figure 4:
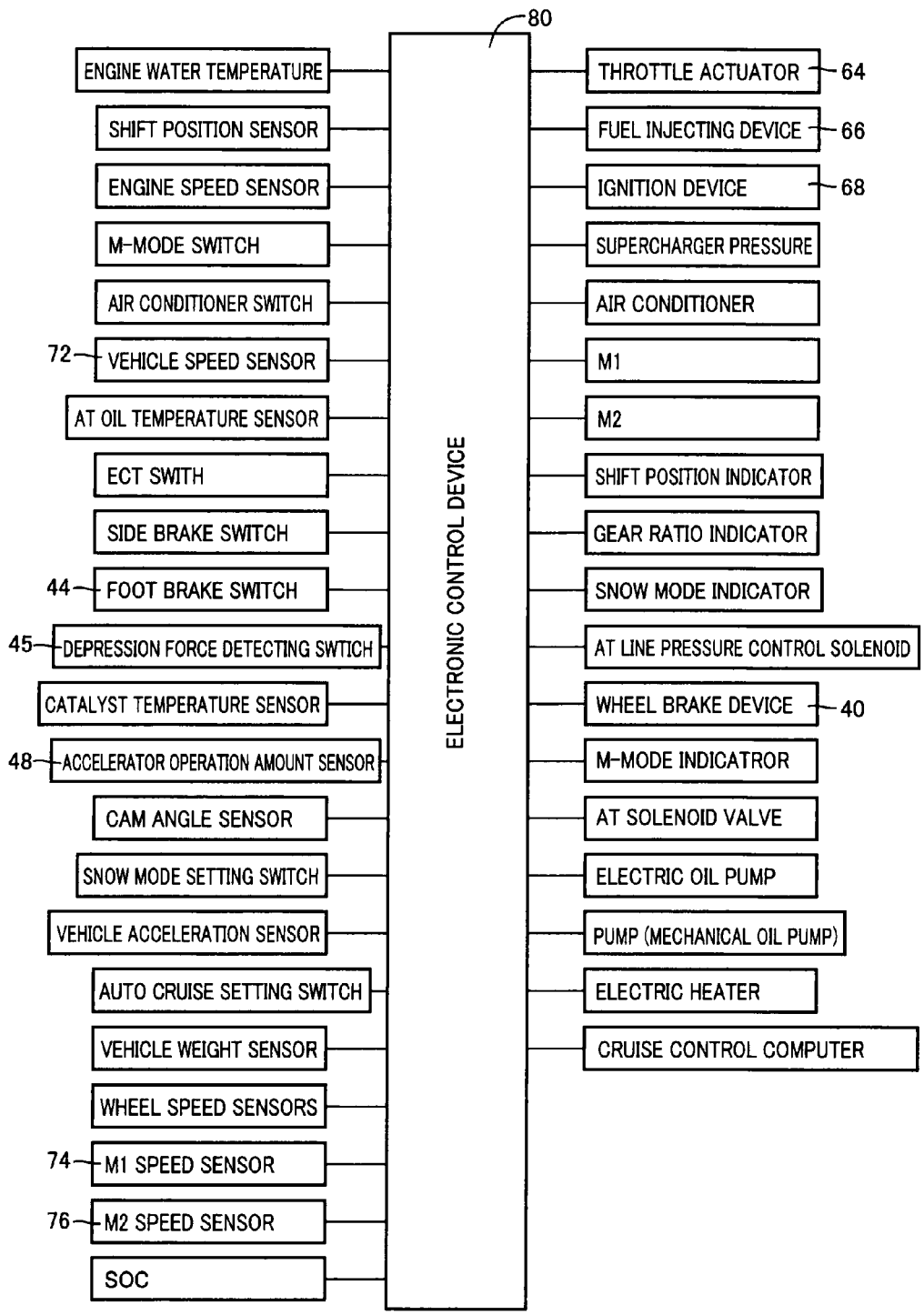
FIG. 4 is a view indicating input and output signals of an electronic control device provided for the vehicular power transmitting system of FIG. 1.

FIG. 4 illustrates signals received by an electronic control device 80 provided to control the power transmitting system 10, and signals generated by the electronic control device 80. This electronic control device 80 includes a so-called microcomputer incorporating a CPU, a ROM, a RAM and an input/output interface, and is arranged to process the signals according to programs stored in the ROM while utilizing a temporary data storage function of the RAM, to implement hybrid drive controls of the engine 8 and first and second electric motors M1 and M2, and other controls such as a shifting control of the automatic transmission portion 20.

The electronic control device 80 is arranged to receive from various sensors and switches shown in FIG. 4, various signals such as: a signal indicative of a temperature $TEMP_W$ of cooling water of the engine 8; a signal indicative of a selected one of shift positions $P_{SH}$ of a shift lever 52 (shown in FIG. 6); a signal indicative of the number of operations of the shift lever 52 from a position M; a signal indicative of the operating speed $N_E$ of the engine 8; a signal commanding an M mode (manual shifting mode); a signal indicative of an operated state of an air conditioner; a signal indicative of the vehicle running speed V corresponding to the rotating speed $N_{OUT}$ of the output shaft 22 detected by a vehicle speed sensor 72 and a direction in which a vehicle is moving; a signal indicative of a temperature $T_{OIL}$ of the working oil of the automatic transmission portion 20; a signal indicative of an operated state of a side brake; a signal indicative of an operated state $B_{ON}$ of a brake pedal 42 (shown in FIG. 7) detected by foot brake switch 44, which signal indicates an operated state (i.e. in a state when the foot brake is in use of a foot brake device (wheel braking system) 40 well known as a braking device to apply a wheel brake torque to the vehicle wheels (drive wheels 34, and driven wheels not shown); a signal indicative of a depression force which acts on the brake pedal 42 and which is detected by a depression force detecting switch 45 (shown in FIG. 7), that is, indicative of an operation amount Bra of the brake pedal 42; a signal indicative of a temperature of a catalyst; a signal indicative of an operator's required amount of an output of the vehicle in the form of an amount of operation $A_{CC}$ of an accelerator pedal 46 (shown in FIG. 7) detected by the accelerator operation amount sensor 48; a signal indicative of an angle of a cam; a signal indicative of the selection of a snow drive mode; a signal indicative of a longitudinal acceleration value G of the vehicle; a signal indicative of the selection of an auto-cruising drive mode; a signal indicative of a weight of the vehicle; signals indicative of speeds of the wheels of the vehicle; a signal indicative of an operating speed $N_{M1}$ of the first electric motor M1 (hereinafter referred to as "first electric motor speed $N_{M1}$") detected by an M1 speed sensor 74 (which may be a resolver), and also indicative of a direction of operation of the first electric motor M1; a signal indicative of an operating speed $N_{M2}$ of the second electric motor M2 (hereinafter referred to as "second electric motor speed $N_{M2}$") detected by an M2 speed sensor 76 (which may be a resolver), and also indicative of a direction of operation of the second electric motor M2; and a signal indicative of a stored amount of electric energy (charged state) SOC of the electric-energy storage device 56 (shown in FIG. 7) which is charged and discharged through the inverter 54 between the electric motors M1, M2.

The electronic control device 80 is further arranged to generate various signals such as: control signals to be applied to an engine output control device 58 (shown in FIG. 7) to control an output $P_E$ (in the unit of "kW", for example, and hereinafter described as "engine output $P_E$") of the engine 8, such as a drive signal to drive a throttle actuator 64 for controlling an angle of opening $\theta_{TH}$ of an electronic throttle valve 62 disposed in an intake pipe 60 of the engine 8, a signal to control an amount of injection of a fuel by a fuel injecting device 66 into the intake pipe 60 or cylinders of the engine 8, a signal to be applied to an ignition device 68 to control the ignition timing of the engine 8, and a signal to adjust a supercharger pressure of the engine 8; a signal to operate the electric air conditioner; signals to operate the first and second electric motors M1 and M2; a signal to operate a shift-range indicator for indicating the selected shift position (operating position); a signal to operate a gear-ratio indicator for indicating the gear ratio; a signal to operate a snow-mode indicator for indicating the selection of the snow drive mode; a signal to operate the wheel braking system 40; a signal to operate an M-mode indicator for indicating the selection of the M-mode; signals to operate solenoid-operated valves incorporated in a hydraulic control unit 70 (shown in FIG. 7) provided to control the hydraulic actuators of the hydraulically operated frictional coupling devices of the differential portion 11 and automatic transmission portion 20; a signal to operate a regulator valve (adjusting valve) incorporated in the hydraulic control unit 70, to regulate a line pressure $P_L$; a signal to control an electrically operated oil pump which is a hydraulic pressure source for generating a hydraulic pressure that is regulated into the line pressure $P_L$; a signal to drive an electric heater; a signal to be applied to a cruise-control computer.

The wheel braking system 40 is arranged to apply braking hydraulic pressures to wheel brake cylinders of wheel brakes, in response to an operation of the brake pedal 42. In a normal operation of this wheel braking system 40, the braking hydraulic pressure corresponding to the depression force acting on the brake pedal 42 is applied from a master cylinder directly to the wheel brake cylinders. When the wheel braking system 40 is operated to implement one of a braking control in a decelerating state (coasting state) of the vehicle; an ABS braking control; a traction control; a VSC braking control; and a hill-hold braking control, the braking hydraulic pressures not directly corresponding to the above-indicated depression force are applied to the wheel brake cylinders to respectively generate: a wheel braking torque in addition to a regenerative braking torque, for achieving a target deceleration value G* of the vehicle in the decelerating state; a vehicle braking torque during a vehicle run on a roadway surface having a low friction coefficient μ; a vehicle braking torque during vehicle starting; a vehicle braking torque during vehicle turning; or a vehicle braking torque for holding the vehicle stationary on a hill roadway.

Figure 5:
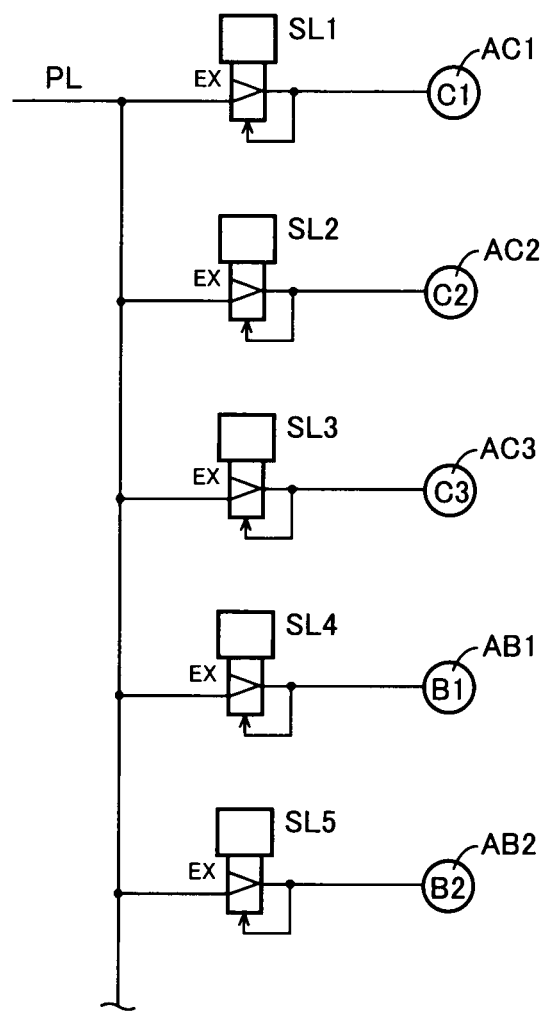
FIG. 5 is a circuit diagram showing a portion of a hydraulic control unit, which portion is provided with linear solenoid valves for controlling hydraulic actuators of clutches and brakes.

FIG. 5 is the circuit diagram showing a portion of the hydraulic control unit 70, which portion is provided with linear solenoid valves SL1-SL5 for controlling hydraulic actuators (hydraulic cylinders) AC1, AC2, AC3, AB1 and AB2 of the clutches C1, C2 and C3 and brakes B1 and B2. As shown in FIG. 5, the linear solenoid valves SL1-SL5 are controlled according to command signals received from the electronic control device 80, to adjust the line pressure PL to respective engaging pressures (engaging hydraulic pressures) PC1, PC2, PC3, PB1 and PB2, which are applied directly to the respective hydraulic actuators AC1, AC2, AC3, AB1 and AB2. The line pressure PL is a pressure which is generated by the electric oil pump not shown, or the mechanical oil pump driven by the engine 8, is regulated by a relief-type pressure adjusting valve (regulator valve) according to a load of the engine 8 as represented by the accelerator pedal operation amount $A_{CC}$ or the throttle valve opening angle $\theta_{TH}$, for example.

The linear solenoid valves SL1-SL5 have substantially the same construction, and are energized or de-energized independently of each other by the electronic control device 80, to adjust the hydraulic pressures of the hydraulic actuators AC1, AC2, AC3, AB1 and AB2 independently of each other, for controlling the engaging pressures PC1, PC2, PC3, PB1 and PB2 of the clutches C1-C3 and brakes B1 and B2, so that the appropriate coupling devices are engaged to shift the automatic transmission portion 20 to the selected one of the shift positions, as indicated in the table of FIG. 2. A shifting action of the automatic transmission portion 20 includes a so-called "clutch-to-clutch" shifting action involving an engaging action of an appropriate one clutch C or brake B selected as an engaged coupling device, and a releasing action of appropriate another clutch C or brake B selected as a released coupling device, which take place concurrently.

Figure 6:
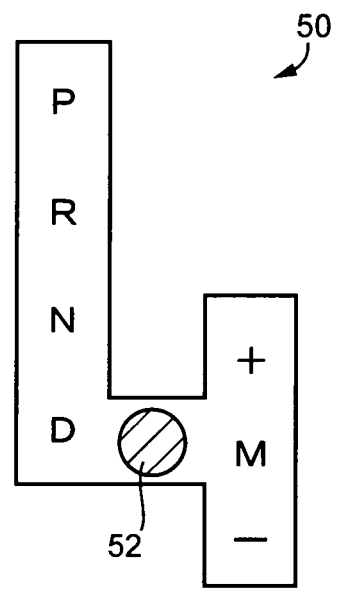
FIG. 6 is a view showing an example of a shifting device provided with a shift lever and operable to select one of a plurality of shift positions.

FIG. 6 is the view showing an example of a manually operable shifting device in the form of a shifting device 50 for selecting one of the plurality of shift positions $P_{SH}$. This shifting device 50 is provided with the shift lever 52, which is disposed laterally adjacent to an operator's seat of the vehicle, for example, and which is manually operated to select one of the plurality of shift positions $P_{SH}$.

The shift lever 52 is manually operable its shift positions consisting of a parking position P for placing the power transmitting system 10 in a neutral state in which the power transmitting path through the automatic transmission portion 20 is disconnected while at the same time the output shaft 22 of the automatic transmission portion 20 is placed in the locked state; a reverse-drive position R for driving the vehicle in the rearward direction; a neutral position N for placing the power transmitting path in the power transmitting system 10 in the neutral state; an automatic forward-drive shifting position D for implementing an automatic shifting control in which the overall speed ratio γT of the power transmitting system 10 is variable within a predetermined range; and a manual forward-drive shifting position M for establishing a shifting range, i.e., a manual shifting mode in which the number of the shift positions available is limited by disabling the automatic transmission portion 20 to be shifted to the relatively high gear position or positions.

As the shift lever 52 is operated manually to select one of the shift positions $P_{SH}$, the hydraulic control unit 70 is electrically operated to switch the hydraulic circuit to establish the rear-drive position R, neutral position N, or one of the gear positions in the automatic forward-drive shifting position D, as indicated in the table of FIG. 2.

Of the shift positions $P_{SH}$ consisting of the above-indicated positions P through M, the parking position P and the neutral position N are non-drive positions selected when the vehicle is not driven, while the reverse-drive position R, and the automatic and manual forward-drive positions D, M are drive positions selected when the vehicle is driven. In the non-drive positions P, N, the power transmitting path in the automatic transmission portion 20 is in the power cut-off state for inhibiting the vehicle to be driven. In the drive positions R, D, M, the power transmitting path in the automatic transmission portion 20 is in the power transmitting state for permitting the vehicle to be driven.

Described in detail, a manual operation of the shift lever 52 to the parking position P causes all of the clutches C and brakes B to be released to place the power transmitting path in the automatic transmission portion 20 in the power cut-off state, and to lock the output shaft 22 of the automatic transmission portion 20. A manual operation of the shift lever 52 to the neutral position N causes all of the clutches C and brakes B to be released to place the power transmitting path in the automatic transmission portion 20 in the power cut-off state. A manual operation of the shift lever 52 to one of the reverse-drive position R, automatic forward-drive position D and manual forward-drive position M causes an appropriate one of the gear positions to be established for placing the power transmitting path in the automatic transmission portion 20 in the power transmitting state.

Figure 7:
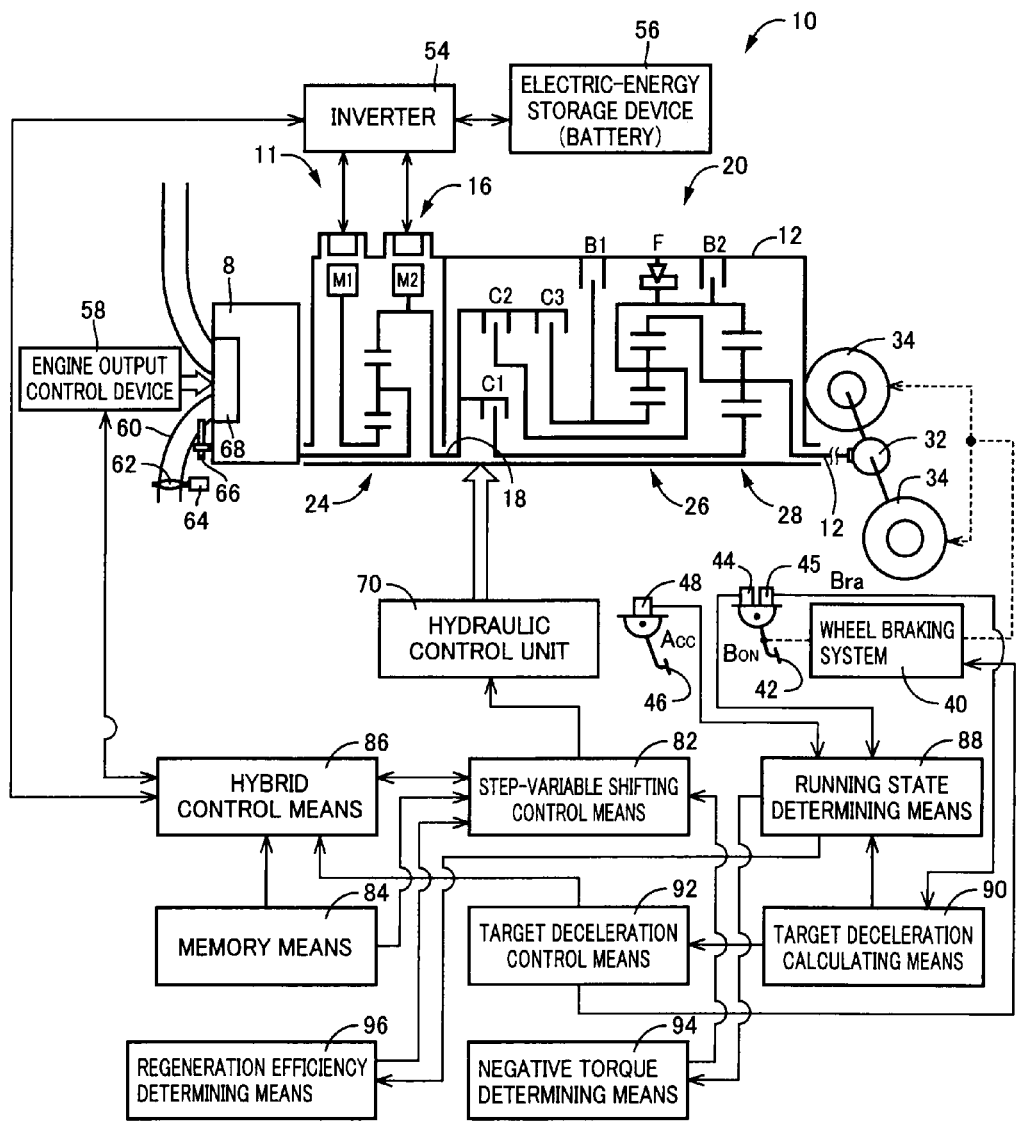
FIG. 7 is a functional block diagram illustrating major control functions of the electronic control device of FIG. 4.

The functional block diagram of FIG. 7 shows major control functions of the electronic control device 80. A step-variable shifting control portion in the form of step-variable shifting control portion 82 shown in FIG. 7 is configured to control the shifting actions of the automatic transmission portion 20 and serves as a shifting control means. For instance, the step-variable shifting control portion 82 is configured to determine whether a shifting action of the automatic transmission portion 20 should take place, that is, to determine the gear position to which the automatic transmission portion 20 should be shifted. This determination is made on the basis of a condition of the vehicle represented by the actual vehicle running speed V and the required output torque $T_{OUT}$ of the automatic transmission portion 20 as represented by the accelerator pedal operation amount $A_{CC}$, and according to a relation (shifting lines or shifting map) of FIG. 8 between selected variables in the form of the vehicle speed V and the output torque $T_{OUT}$ of the automatic transmission portion 20 (or the accelerator pedal operation amount $A_{CC}$), for example. This relation is stored in a memory portion in the form of memory means 84, and represents shift-up boundary lines (indicated by solid lines in FIG. 8) and shift-down boundary lines (indicated by one-dot chain lines in FIG. 8). The step-variable shifting control means 82 implements an automatic shifting control to shift the automatic transmission portion 20 to the determined gear position.

The step-variable shifting control portion 82 generates a command (shifting control command or hydraulic command) to be applied to the hydraulic control unit 70, to engage and release the hydraulically operated frictional coupling devices for establishing the determined gear position of the automatic transmission portion 20 according to the table of FIG. 2. Namely, the step-variable shifting control portion 82 commands the hydraulic control unit 70 to perform a clutch-to-clutch shifting operation involving a releasing action and an engaging action of the appropriate two frictional coupling devices for establishing the determined gear position of the automatic transmission portion 20. According to the received command, the hydraulic control unit 70 controls the corresponding two linear solenoid valves incorporated therein, for activating the appropriate hydraulic actuators of the appropriate two frictional coupling devices to concurrently engage one of the two frictional coupling devices and release the other frictional coupling device, to effect the clutch-to-clutch shifting operation of the automatic transmission portion 20 to the determined gear position.

A hybrid control portion in the form of hybrid control means 86 has a function as engine drive control means for controlling the engine 8 through the engine output control device 58, and a function as electric motor control means for controlling the first electric motor M1 and second electric motor M2 to operate as the drive power source or electric generator through the inverter 54, and is configured to implement hybrid controls of the engine 8 and the first and second electric motors M1, M2.

The hybrid control means 86 controls the engine 8 to be operated in an operating range of high efficiency, and controls the first and second electric motors M1, M2 so as to optimize a proportion of drive forces generated by the engine 8 and the second electric motor M2, and a reaction force generated by the first electric motor M1, for thereby controlling the speed ratio γ0 of the differential portion 11 operating as the electric continuously-variable transmission. For instance, the hybrid control portion 86 calculates a target (required) vehicle output at the present vehicle running speed V, on the basis of the accelerator pedal operation amount $A_{CC}$ used as the operator's required vehicle output and the vehicle running speed V, and calculate a target total vehicle output required on the basis of the calculated target vehicle output and a required amount of generation of an electric energy to be stored. The hybrid control portion 86 calculates a target output (required engine output) $P_{ER}$ of the engine 8 to obtain the calculated target total vehicle output, while taking account of a power transmission loss, a load acting on various devices of the vehicle, an assisting torque generated by the second electric motor M2, etc. The hybrid control portion 86 controls the speed $N_E$ and torque $T_E$ of the engine 8, so as to obtain the calculated target engine output $P_{ER}$, and controls each electric motor to execute which one of to output or generating electric energy.

As described above, the overall speed ratio γT of the power transmitting system 10 as a whole is determined by the speed ratio $γ_{AT}$ of the automatic transmission portion 20 controlled by the step-variable shifting control means 82, and the speed ratio γ0 of the differential portion 11 controlled by the hybrid control means 86. That is, the hybrid control means 86 and the step-variable shifting control means 82 function as shifting control means for controlling the overall speed ratio γT of the power transmitting system 10 as a whole, through the hydraulic control unit 70, engine output control device 58, and first and second electric motors M1, M2, in each of the gear positions available in the selected shift position $P_{SH}$.

Figure 9:
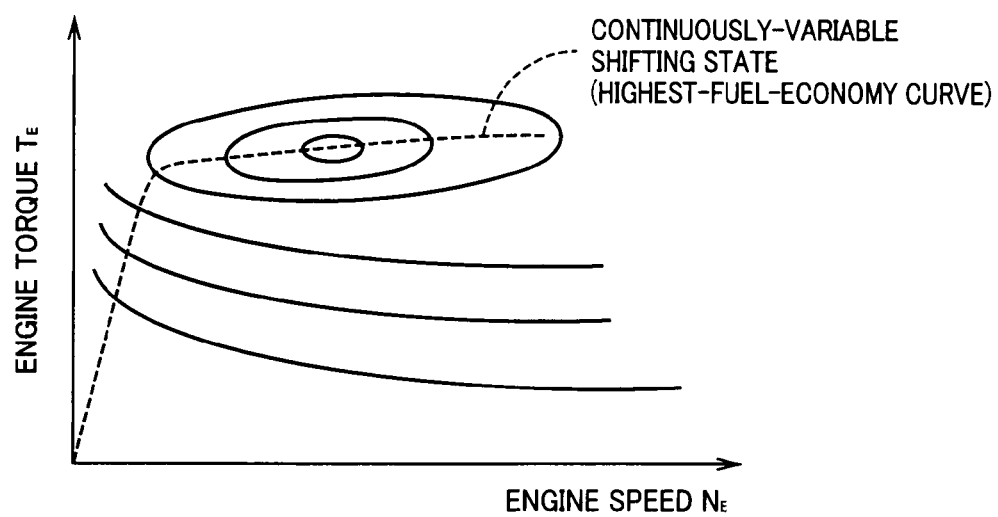
FIG. 9 is a view indicting an example of a highest-fuel-economy curve of an engine shown in FIG. 1.

For example, the hybrid control portion 86 is arranged to implement controlling engine 8 and each motor M while taking account of the presently selected gear position of the automatic transmission portion 20, so as to improve the drivability and fuel economy of the vehicle. In this hybrid control, the differential portion 11 is controlled to function as the electric continuously-variable transmission, for optimum coordination of the engine speed $N_E$ for its efficient operation, and the rotating speed of the power transmitting member 18 determined by the vehicle speed V and the selected gear position of the automatic transmission portion 20. That is, the hybrid control portion 86 determines a target value of the overall speed ratio γT of the power transmitting system 10, such that an operating point of the engine 8 (hereinafter referred to as "engine operating point") moves along a highest-fuel-economy curve (fuel-economy map or relation) which is one example of performance curves of the engine 8 and is indicated by broken line in FIG. 9 and which is stored in the memory means 84. The highest fuel-economy curve is obtained by experimentation so as to satisfy both of the desired operating efficiency and the highest fuel economy of the engine 8 in the continuously-variable shifting state, and is defined in a two-dimensional coordinate system defined by an axis of the engine speed $N_E$ and an axis of the engine torque $T_E$. The target value of the overall speed ratio γT of the power transmitting system 10 permits the engine torque $T_E$ and speed $N_E$ to be controlled so that the engine 8 provides an output necessary for obtaining the target vehicle output $P_E$ (target total vehicle output or required vehicle drive force). The hybrid control portion 86 controls the speed ratio γ0 of the differential portion 11, while taking account of the selected gear position of the automatic transmission portion 20, so as to obtain the target value of the overall speed ratio γT, so that the overall speed ratio $\gamma T$ can be controlled within a predetermined range. The engine operating point referred to above is a point which indicates the operating state of the engine 8 as represented by the engine speed $N_E$ and torque $T_E$, and which is located in a two-dimensional coordinate system wherein the engine speed $N_E$ and torque $T_E$ are taken along respective axes. In the present embodiment, the fuel economy is represented by a vehicle running distance per unit amount of fuel consumption, or a fuel consumption ratio for a vehicle as a whole (fuel consumption amount/drive wheel output), for example.

In the hybrid control, the hybrid control portion 86 controls the inverter 54 such that the electric energy generated by the first electric motor M1 is supplied to the electric-energy storage device 56 and the second electric motor M2 through the inverter 54, for example. That is, a major portion of the drive force produced by the engine 8 is mechanically transmitted to the power transmitting member 18, while the remaining portion of the drive force is consumed by one of the electric motors M for generation to convert this portion into the electric energy, which is supplied through the inverter 54 to the other electric motor M, so that this latter electric motor M is operated with the supplied electric energy, to produce a driving force to be transmitted to the power transmitting member 18. Thus, the devices associated with the generation of an electric energy by one of the electric motors M and the consumption of this electric energy by the other electric motor M provide an electric path through which the electric energy generated by conversion of a portion of the drive force of the engine 8 is converted into the mechanical energy.

When the step-variable shifting control means 82 implements the shifting control of the automatic transmission portion 20, the overall speed ratio $\gamma T$ of the power transmitting system 10 is changed in steps, as a result of shifting actions of the automatic transmission portion 20 with a stepping change of its speed ratio. This shifting control resulting in a stepping or non-continuous change of the overall speed ratio $\gamma T$ permits a more rapid change of the vehicle drive torque, than a shifting control for a continuous change of the overall speed ratio $\gamma T$. On the other hand, the shifting control for the stepping change of the overall speed ratio $\gamma T$ gives rise to a risk of generation of a shifting shock, and reduction of the fuel economy due to a failure to control the engine speed $N_E$ along the highest-fuel-economy curve. To prevent the overall speed ratio $\gamma T$ from changing in steps, the hybrid control means 86 implements a shifting control of the differential portion 11 such that the speed ratio of the differential portion 11 changes in a direction opposite to a direction of change of the speed ratio of the automatic transmission portion 20, in synchronization with the shifting action of the automatic transmission portion 20. In other words, the hybrid control means 86 implements the shifting control of the differential portion 11, in synchronization with the shifting control of the automatic transmission portion 20, so that the overall speed ratio $\gamma T$ of the power transmitting system 10 continuously changes during the shifting action of the automatic transmission portion 20. For instance, the hybrid control means 86 implements the shifting control of the differential portion 11 in synchronization with the shifting action of the automatic transmission portion 20, such that the speed ratio of the differential portion 11 changes in steps in the direction opposite to the direction of the stepping change of the speed ratio of the automatic transmission portion 20, by an amount equal to the amount of the stepping change of the speed ratio of the automatic transmission portion 20, to prevent a transient stepping change of the overall speed ratio $\gamma T$ of the power transmitting system 10 during the shifting action of the automatic transmission portion 20.

The hybrid control portion 86 is further arranged to hold the engine speed $N_E$ substantially constant or at a desired value, by controlling the first electric motor speed $N_{M1}$ and/or the second electric motor speed $N_{M2}$, through the electric CVT function of the differential portion 11, irrespective of whether the vehicle is stationary or running. In other words, the hybrid control portion 86 is capable of controlling the first electric motor speed $N_{M1}$ and/or the second electric motor speed $N_{M2}$ as desired, while holding the engine speed $N_E$ substantially constant or at a desired value.

To raise the engine speed $N_E$ during running of the vehicle, for example, the hybrid control portion 86 raises the first electric motor speed $N_{M1}$ while the second electric motor speed $N_{M2}$ determined by the vehicle speed V (rotating speed of the drive wheels 34) is held substantially constant, as is apparent from the collinear chart of FIG. 3. To hold the engine speed $N_E$ substantially constant during a shifting action of the automatic transmission portion 20, the hybrid control portion 86 changes the first electric motor speed $N_{M1}$ in a direction opposite to a direction of change of the second electric motor speed $N_{M2}$ caused by the shifting action of the automatic transmission portion 20.

The hybrid control portion 86 applies control commands to the engine-output control device 58, for commanding the throttle actuator 64 to open and close the electronic throttle valve 62 for a throttle control, and commanding the fuel injecting device 66, to control an amount and time of fuel injection by the fuel injecting device 66 for an injection control, and commanding the ignition device 68 such as igniter to control the timing of ignition of the igniter for an ignition control, alone or in combination, for thereby controlling the engine 8 to provide the required engine output $P_E$. That is, the hybrid control means 86 functions as engine drive control means for controlling the engine 8.

For instance, the hybrid control portion 86 is basically arranged to control the throttle actuator 64 on the basis of the accelerator pedal operation amount $A_{CC}$ and according to a predetermined stored relationship (not shown) between the operation amount $A_{CC}$ and the throttle valve opening angle $\theta_{TH}$ such that the opening angle $\theta_{TH}$ increases with an increase of the operation amount $A_{CC}$. The engine output control device 58 implements an engine torque control according to the commands received from the hybrid control means 86, by controlling the throttle actuator 64 to open and close the electronic throttle valve 62 for the throttle control, controlling the fuel injecting device 66 to control the fuel injection for the injection control, and controlling the ignition device 68 to control the ignition timing of the igniter for the injection control.

The hybrid control portion 86 is capable of establishing a motor drive mode (EV drive mode) to drive the vehicle with the second electric motor M2 being used as the vehicle drive power source, for example, without using the engine 8, by utilizing the electric CVT function (differential function) of the differential portion 11, irrespective of whether the engine 8 is in the non-operated state or in the idling state. Solid line A in FIG. 8 referred to above indicates an example of a boundary line defining an engine drive region and a motor drive region, which is provided for switching the vehicle drive power source between the engine 8 and the electric motor, for example, second electric motor M2, for starting and driving the vehicle, namely, for switching between a so-called engine drive mode using the engine 8 as the vehicle drive power source, and the so-called motor drive mode using the second electric motor M2 as the vehicle drive power source. A stored relationship represented by this boundary line (solid line A) of FIG. 8 for switching between the engine drive mode and the motor drive mode is an example of a drive-power-source switching line map (drive-power-source map) defined in a two-dimensional coordinate system in which variables in the form of the vehicle speed V and the output torque $T_{OUT}$ of the automatic transmission portion 20 are taken along respective axes. This drive-power-source switching line map is stored in the memory means 84, together with the shifting line map (shifting map) indicated by solid and one-dot chain lines in FIG. 8.

Figure 8:
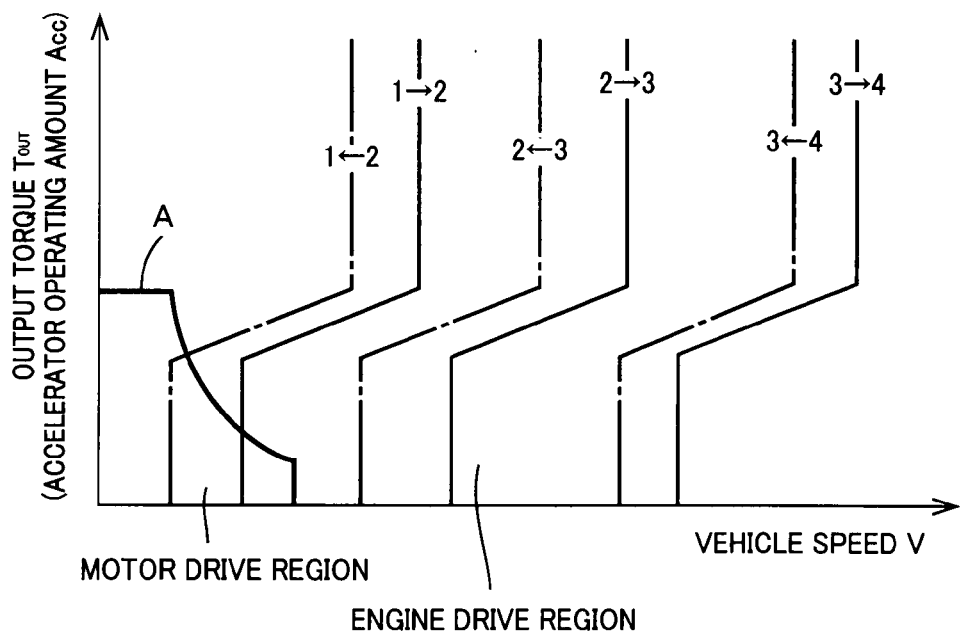
FIG. 8 is a view illustrating an example of a stored shifting line map used for determining a shifting action of the automatic transmission portion of the vehicular power transmitting system of FIG. 1, and an example of a stored drive-power-source switching line map used for switching a vehicle drive mode between an engine drive mode and a motor drive mode, wherein the maps are indicated in relation to each other.

The hybrid control means 86 determines, according to the drive-power-source switching line map shown in FIG. 8 for example, whether the point representative of the actual vehicle speed V and the required output torque $T_{OUT}$ of the automatic transmission portion 20 is located in the motor drive region or in the engine drive region, and establishes the motor drive mode or the engine drive mode according to a result of the determination. As is apparent from FIG. 8, the hybrid control portion 86 establishes the motor-drive mode, when the operating efficiency of the engine 8 is relatively low, namely, when the output torque $T_{OUT}$ (accelerator pedal operation amount $A_{CC}$) is relatively small, that is, when the engine torque $T_E$ is comparatively small or when the vehicle speed V is comparatively low, that is, when the vehicle is running in a low-load state.

For reducing a dragging of the engine 8 in its non-operated state and improving the fuel economy in the motor-drive mode, the hybrid control portion 86 is configured to hold the engine speed $N_E$ at zero or substantially zero as needed, owing to the electric CVT function (differential function) of the differential portion 11, by placing the first electric motor M1 in a non-load state, so as to be freely rotated at a negative speed $N_{M1}$.

The hybrid control portion 86 is further capable of performing a so-called "torque assisting" operation to assist the engine 8, even in the engine drive region, by supplying an electric energy from the first electric motor M1 or the electric-energy storage device 56 to the second electric motor M2 through the above-described electric path, so that the second electric motor M2 is operated to transmit a drive torque to the drive wheels 34. Thus, the vehicle of the embodiment can be driven by the engine 8 used as the vehicle drive power source, or by both of the engine 8 and the second electric motor M2 used as the vehicle drive power source. In the motor drive mode, the vehicle is driven by the second electric motor M2 used as the vehicle drive power source, while the engine 8 is held at rest.

The hybrid control portion 86 is further configured to place the first electric motor M1 in a non-load state in which the first electric motor M1 is freely rotated, so that the differential portion 11 is placed in a state similar to the power cut-off state in which torque cannot be transmitted through the power transmitting path within the differential portion 11, and no output can be generated from the differential portion 11. Namely, the hybrid control portion 86 is arranged to place the first electric motor M1 in the non-load state, for thereby placing the differential portion 11 in a neutral state in which the power transmitting path is electrically cut off.

The hybrid control portion 86 is also configured to implement a regenerative control to improve the fuel economy (to reduce fuel consumption ratio) during deceleration (coasting) of the vehicle with the accelerator pedal held in the off state, or during brake application to the vehicle wheels by operation of the brake pedal 42. In the regenerative control, the engine 8 is held in its non-operated state, and a kinetic energy transmitted from the drive wheels 34 to the differential portion 11 is converted by the differential portion 11 into an electric energy. Described in detail, a reverse vehicle drive force transmitted from the drive wheels 34 toward the engine 8 is used to operate the second electric motor M2 as the electric generator, to generate an electric energy (electric current) with which the electric-energy storage device 56 is charged through the inverter 54. Namely, the hybrid control means 86 functions as regenerative control means for implementing the above-described regenerative control.

In the regenerative control, the target vehicle deceleration value G* during a coasting run of the vehicle is determined, and a braking torque (braking force) to be applied to the vehicle is generated so as to achieve the determined target vehicle deceleration value G*. This braking torque is generated by the regenerative operation of the second electric motor M2 and the wheel braking by the wheel braking system 40, for example. In view of the energy efficiency, control priority is given to the regenerative braking. While the vehicle is in a non-braked state with the brake pedal 42 placed in the non-operated state, for example, the braking torque for achieving the target vehicle deceleration value G* is primarily provided by the regenerative braking torque. While the vehicle is in a braked state with the brake pedal 42 placed in an operated state, on the other hand, the braking torque for achieving the target vehicle deceleration value G* is provided by the regenerative braking torque and the wheel braking torque, with a predetermined proportion of the regenerative braking torque and the wheel braking torque. An increase of the braking torque for achieving the target vehicle deceleration value G*, which takes place due to the operation of the brake pedal 42 is not provided by only the wheel braking torque, but is provided by the regenerative braking torque in addition to the wheel braking torque such that the wheel braking torque and the regenerative braking toque have a proportion adequate to improve the fuel economy. To achieve the target vehicle deceleration value G* in a decelerating state of the vehicle with the accelerator pedal placed in the non-operated state, the hybrid control means 52 implements a fuel cut control to stop the operation of the engine 8 and hold the first electric motor M1 in the freely operable state, while holding the engine speed $N_E$ at zero or substantially zero owing to the differential function of the differential portion 11, without the engine speed $N_E$ being determined by the vehicle speed V, that is, irrespective of the transmitting-member speed $N_{18}$ determined uniquely by the rotating speed $N_{OUT}$ of the output shaft 22 of the automatic transmission portion 20 and the speed ratio $\gamma_{AT}$. Thus, a pumping loss due to a dragging (a resistance to rotation) of the engine 8 is reduced to reduce the braking torque (vehicle deceleration) due to the engine dragging torque, whereby the amount of the regenerated electric energy is increased.

By the way, a coasting shift-down operation of the automatic transmission 20 is performed when the point representative of the vehicle running condition during its coasting run passes across one of the shift-down boundary lines. The step-variable shifting control means 82 implements the shifting control to perform this coasting shift-down operation by placing the appropriate clutch in a free state, for example. Namely, the step-variable shifting control means 82 applies a hydraulic control command to the hydraulic control unit 70, so that the commanded hydraulic pressure value of the coupling device to be released is zeroed at a moment of starting of the coasting shift-down operation while the commanded hydraulic pressure value of the coupling device to be engaged is set to be a low standby pressure value during shifting operation. During the coasting shift-down operation under the control of the step-variable shifting control means 82, the hybrid control means 86 controls the second electric motor M2 to raise the rotating speed of the power transmitting member 18 to a synchronous speed value to be established after completion of the coasting shift-down operation. Thus, in the process of the coasting shift-down operation of the automatic transmission portion 20, the hybrid control means 86 implements a shifting synchronization control to place the power transmitting path through the automatic transmission portion 20 in the power cut-off state, and to control the second electric motor M2 for controlling the rotating speed of the input-side rotary member of the automatic transmission portion 20 (that is, the power transmitting member 18) to the synchronous speed value to be established after the coasting shift-down operation.

When the coasting shift-down operation of the automatic transmission portion 20 is performed by releasing the clutch under the control of the step-variable shifting control means 82, the shifting synchronization control implemented by controlling the second electric motor M2 prevents an influence of the output torque of the automatic transmission portion 20 by a change of its input torque $T_{IN}$ in the released state of the clutch, and does not require a complicated torque transfer control as required in the clutch-to-clutch shifting operation. Upon completion of the coasting shift-down operation with the released clutch being restored to its engaged state, however, the input torque $T_{IN}$ of the automatic transmission portion 20 (which is the regenerative torque of the second electric motor M2, for example) is transmitted to the output side of the automatic transmission portion 20 in a stepping manner, giving rise to a risk of generation of a shifting shock of the automatic transmission portion 20.

Figure 10:
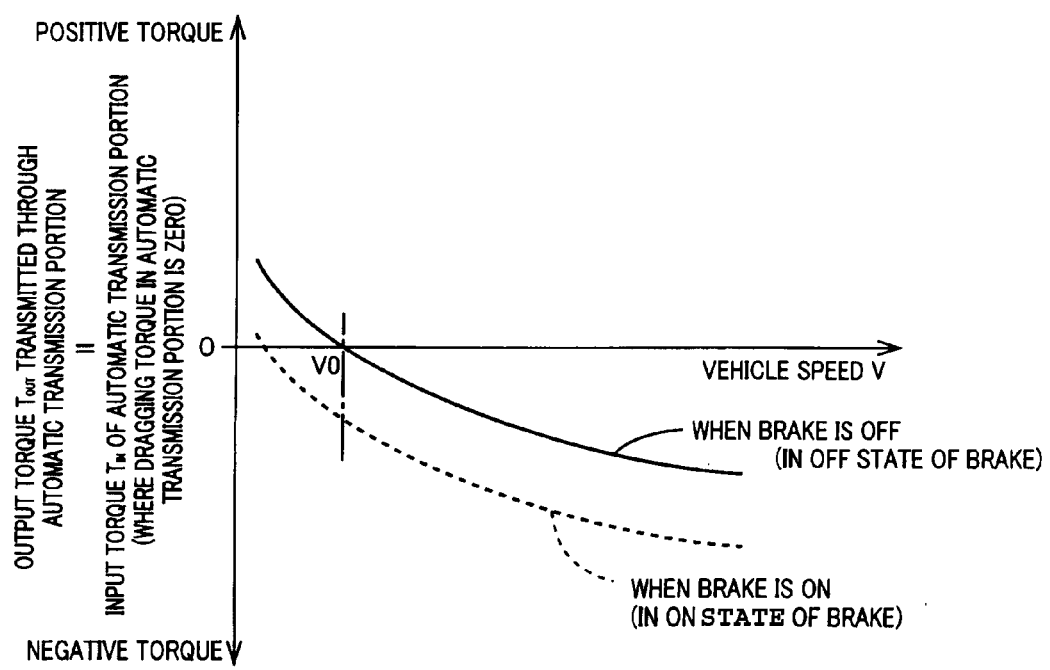
FIG. 10 is a view indicating examples of an output torque of the automatic transmission portion, which has been transmitted through the automatic transmission portion and which varies with a vehicle running speed in a decelerating state of the vehicle.

The above-described coasting shift-down operation to be performed at an adequate timing so as to reduce the shifting shock will be described in detail. FIG. 10 is the view indicating examples of the output torque $T_{OUT}$ of the automatic transmission portion 20, which has been transmitted through the automatic transmission portion 20 and which varies with the vehicle running speed V in a decelerating state of the vehicle. This output torque $T_{OUT}$ which has been transmitted through the automatic transmission portion 20 is equal to the input torque $T_{IN}$ where the dragging torque within the automatic transmission portion 20 is considered to be zero. In the present embodiment, the output torque $T_{OUT}$ is considered to be equal to the input torque $T_{IN}$. In FIG. 10, solid line indicates the case when the brake is off (in the off state of the brake) while broken line indicates the case when the brake is on (in the on state of the brake). The input torque $T_{IN}$ of the automatic transmission portion 20 is the regenerative torque generated by the second electric motor M2 as the braking torque primarily used to achieve the target vehicle deceleration value G*. When the vehicle speed V is relatively low, a creep torque rather than the regenerative torque is generated by the second electric motor M2, so that the input torque $T_{IN}$ is changed from a negative value to a positive value.

When the brake is on, on the other hand, the target vehicle deceleration value G* is made higher than when the brake is off, so that the regenerative torque is accordingly increased, and the input torque $T_{IN}$ of the automatic transmission portion 20 which is the negative value is accordingly increased as indicated by the broken line. The regenerative torque when the brake is on changes with a change of the target vehicle deceleration value G*, so that the negative torque changes when the target vehicle deceleration value G* changes. This change is not shown in FIG. 10. Thus, the regenerative torque, that is, the input torque $T_{IN}$ of the automatic transmission portion 20 at a given value of the vehicle speed V may change depending upon whether the brake is on or off, and on the brake operating amount Bra. If a coasting shift-down vehicle speed point at which the coasting shift-down operation is performed is selected at a value V0 uniformly at which the input torque $T_{IN}$ of the automatic transmission portion 20 is zero or substantially zero so that the shifting shock is reduced when the brake is off (as indicated by the solid line), the negative torque generated during the coasting shift-down operation when the brake is on (as indicated by the broken line) is made larger than when the brake is off. Therefore, upon completion of the coasting shift-down operation performed when the brake is on, the torque value on the output side of the automatic transmission portion 20 (output torque $T_{OUT}$ of the automatic transmission portion 20, which has transmitted through the automatic transmission portion 20) is made large, giving rise to a risk of increasing the shifting shock in the coasting shift-down operation.

In view of the above, to reduce the shifting shock the present embodiment is configured to perform the coasting shift-down operation of the automatic transmission portion 20 under the condition of a determination in a decelerating state of the vehicle that the input torque $T_{IN}$ of the automatic transmission portion 20 including the regenerative torque, that is, the output torque $T_{OUT}$ of the automatic transmission portion 20 which has transmitted through the automatic transmission portion 20 is substantially zero. When the deceleration value of the vehicle in the decelerating state is relatively large, on the other hand, the shifting shock is considered to be less likely to be felt by the vehicle user than when the deceleration value is relatively small, since the shifting shock when the deceleration value is relatively large is hardly distinguishable from or hidden in the vehicle deceleration (deceleration shock, for instance). In this instance, therefore, it is considered better to perform the coasting shift-down operation of the automatic transmission portion 20, so as to attain (give control priority to) an improvement of the fuel economy rather than reduction of the shifting shock. Based on this consideration, the present embodiment is configured such that when the target vehicle deceleration value G* is larger than a predetermined threshold, the coasting shift-down operation of the automatic transmission portion 20 is performed so as to improve the fuel economy, not under the condition of the determination that the input torque $T_{IN}$ of the automatic transmission 20 is substantially zero, so that the fuel economy is improved, rather than the shifting shock is reduced.

Described in more detail referring back to FIG. 7, a running state determining portion in the form of running state determining means 88 is provided to determine, on the basis of the accelerator pedal operation amount $A_{CC}$, whether the vehicle is in the decelerating state with the accelerator pedal placed in the non-operated state, that is, in the coasting state.

A target deceleration calculating portion in the form of target deceleration calculating means 90 is provided to calculate the target vehicle deceleration value G* in the decelerating state of the vehicle, when the running state determining means 88 has determined that the vehicle is in the decelerating state. When the brake is off, the target deceleration calculating means 90 calculates the target vehicle deceleration value G* in the decelerating state on the basis of an actual value of the vehicle speed V and according to a relationship between the vehicle speed V and the target vehicle deceleration value G*, which relationship is stored in the memory means 84 and which is obtained by experimentation such that the target vehicle deceleration value G* increases with an increase of the vehicle speed V, for example. When the brake is on, the target deceleration calculating means 90 calculates the target vehicle deceleration value G* on the basis of an actual value of the brake operation amount Bra and according to a relationship between the brake operation amount Bra and the target vehicle deceleration value G*, which is stored in the memory means 84 and which is obtained by experimentation such that the target vehicle deceleration value G* increases with an increase of the brake operation amount Bra. This target vehicle deceleration value G* calculated when the brake is on is larger than that calculated as described above when the brake is off.

A target deceleration control portion in the form of target deceleration control means 92 is provided to generate the vehicle braking torque so as to achieve the target vehicle deceleration value G* calculated by the target deceleration calculating means 90. When the brake is off, for example, the target deceleration control means 92 commands the hybrid control means 86 to generate brake force by the regenerative torque for achieving the target vehicle deceleration value G*, so that obtaining the brake force for achieving the target vehicle deceleration value G* is primarily obtained by the regenerative torque for improving the energy efficiency. When the brake is on, on the other hand, the target deceleration control means 90 calculates the regenerative torque and the wheel braking torque such that the regenerative torque and the wheel braking torque have a proportion determined by experimentation so that the brake force for achieving the target vehicle deceleration value G* is obtained by both of the regenerative torque and the wheel braking torque, commands the hybrid control means 86 to generate the calculated regenerative torque, and commands the wheel braking system 40 to generate the calculated wheel braking torque.

The running state determining means 88 is further configured to determine whether the target vehicle deceleration value G* calculated by the target deceleration calculating means 90 is equal to or larger than a predetermined threshold value G*'. This threshold value G' is a value obtained by experimentation as a threshold of the target vehicle deceleration value G* above which the shifting shock is less likely to be felt, and control priority is given to the improvement of the fuel economy rather than to the reduction of the shifting shock.

When the running state determining means 88 has determined that the target vehicle deceleration value G* is smaller than the predetermined threshold value G*', a negative torque determining portion in the form of negative torque determining means 94 determines whether the regenerative torque generated in the vehicle decelerating state is equal to a predetermined value, for example, a predetermined regenerative torque value, to determine whether the input torque $T_{IN}$ of the automatic transmission portion 20 is zero at which the shifting shock in the coasting shift-down operation can be reduced. The above-indicated predetermined regenerative torque value is a value for determining the input torque being zero, obtained by experimentation to determine that the input torque $T_{IN}$ of the automatic transmission portion 20 is zero or substantially zero, when the regenerative torque is equal to the predetermined value.

When the running state determining means 88 has determined that the target vehicle deceleration value G* is equal to or larger than the predetermined threshold value G*', a regeneration efficiency determining portion in the form of regeneration efficiency determining means 96 determines whether the vehicle speed V (or the second electric motor speed $N_{M2}$ determined uniquely by the vehicle speed V and the speed ratio $\gamma_{AT}$ of the automatic transmission portion 20) is equal to a predetermined vehicle speed value V' (or a predetermined second electric motor speed value $N_{M2}$') which is obtained by experimentation above which the regeneration efficiency of the second electric motor M2 can be maximized so that control priority is given to the improvement of the fuel economy rather than to the reduction of the shifting shock.

When the negative torque determining means 94 has determined that the regenerative torque in the vehicle decelerating state is equal to the predetermined value, or when the regeneration efficiency determining means 96 has determined that the vehicle speed V (or second electric motor speed $N_{M2}$) is equal to the predetermined value V (or predetermined value $N_{M2}$'), the step-variable shifting control means 82 implements the shifting control to perform the coasting shift-down operation of the automatic transmission portion 20. For example, the step-variable shifting control means 82 places the appropriate clutch in the free state to perform the coasting shift-down operation of the automatic transmission portion 20. In the process of the coasting shift-down operation by placing the appropriate clutch in the free state, the hybrid control means 86 implements the shifting synchronization control to control the second electric motor M2 for controlling the rotating speed $N_{18}$ of the power transmitting member 18.

Figure 11:
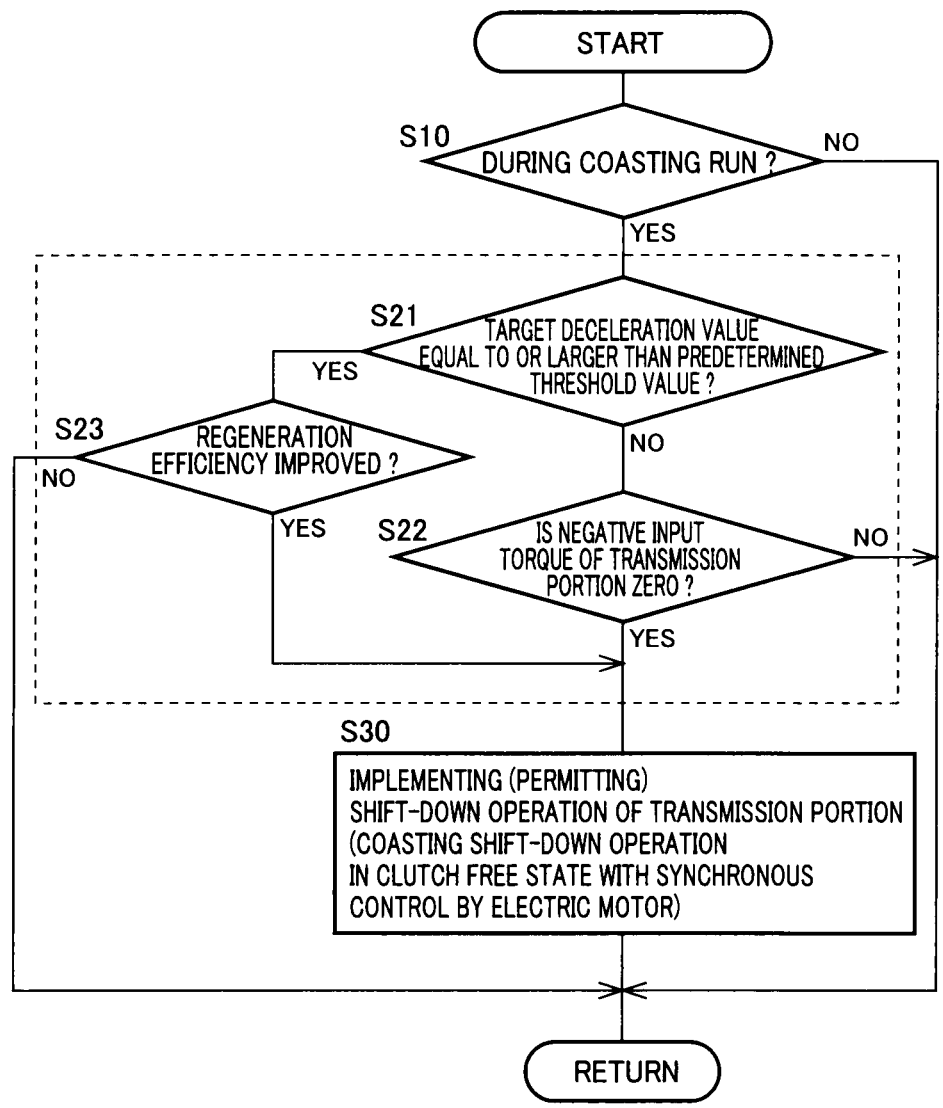
FIG. 11 is a flow chart illustrating a major control operation of the electronic control device, namely, a control routine executed to reduce an amount of change of an input torque of the automatic transmission portion in a coasting shift-down operation thereof for thereby reducing a shifting shock of the automatic transmission portion.

FIG. 11 is the flow chart illustrating a major control operation of the electronic control device 80, namely, a control routine executed to reduce an amount of change of the input torque $T_{IN}$ of the automatic transmission portion 20 in a coasting shift-down operation thereof for thereby reducing a shifting shock of the automatic transmission portion 20. This control routine is repeatedly executed with an extremely short cycle time of several msecs. to several tens of msecs.

As illustrated in FIG. 11, a step S10 ("step" being hereinafter omitted) corresponding to the running state determining means 88 is initially implemented to determine whether the vehicle is in a decelerating state, namely, in a coasting run, with the accelerator pedal being placed in the off state. This determination is made on the basis of the accelerator pedal operation amount $A_{CC}$. If a negative determination is obtained in S10, the present control routine is terminated. If an affirmative determination is obtained in S10, the control flow goes to S21 also corresponding to the running state determining means 88, to determine whether the target vehicle deceleration value G* calculated by the target deceleration calculating means 90 is equal to or larger than a predetermined value, for instance, the predetermined threshold value G*'. If a negative determination is obtained in S21, with the calculated target vehicle deceleration value G* being smaller than the predetermined threshold value G*', the control flow goes to S22 corresponding to the negative torque determining means 94, to determine whether the input torque $T_{IN}$ of the automatic transmission portion 20 is zero. This determination is made by determining whether the regenerative torque in the vehicle decelerating state is equal to the predetermined value, for example, the predetermined regenerative torque value. If an affirmative determination is obtained in S21, with the calculated target vehicle deceleration value G* being equal to or larger than the predetermined threshold value G*', on the other hand, the control flow goes to S23 corresponding to the regeneration efficiency determining means 96, to determine whether the vehicle speed V (or the second electric motor speed $N_{M2}$) is equal to the predetermined value V' (or predetermined second electric motor speed value $N_{M2}$') which is obtained by experimentation above which the regeneration efficiency of the second electric motor M2 can be maximized.

If a negative determination is obtained in S22 or S23, the present control routine is terminated. If an affirmative determination is obtained in S22 or S23, the control flow goes to S30 corresponding to the step-variable shifting control means

82 and hybrid control means 86, to perform the coasting shift-down operation of the automatic transmission portion 20 by placing the appropriate clutch in the free state. In the process of the coasting shift-down operation in the free state of the appropriate clutch, the synchronous control of the transmitting-member speed $N_{18}$ is implemented by the second electric motor M2. Thus, while the target vehicle deceleration value $G^*$ is relatively small, the coasting shift-down operation of the automatic transmission portion 20 is adequately performed when it has been determined that the input torque $T_{IN}$ of the automatic transmission portion 20 is zero. Accordingly, the amount of change of the output torque of the automatic transmission portion 20 upon completion of the coasting shift-down operation can be minimized while the target vehicle deceleration value $G^*$ is relatively small. While the target vehicle deceleration value $G^*$ is relatively high, on the other hand, the coasting shift-down operation of the automatic transmission portion 20 is adequately performed when the regeneration efficiency of the second electric motor M2 is maximum. Accordingly, while the target vehicle deceleration value $G^*$ is relatively large, control priority is given to the improvement of the fuel economy rather than to the reduction of the amount of change of the output torque of the automatic transmission portion 20 upon completion of the coasting shift-down operation of the automatic transmission portion 20.

The present embodiment described above is configured to implement the shifting control to perform the coasting shift-down operation of the automatic transmission portion 20 under the condition of the determination in the decelerating state of the vehicle that the input torque $T_{IN}$ of the automatic transmission portion 20 including the regenerative torque generated by the second electric motor M2 is substantially zero or zero. Therefore, the input torque $T_{IN}$ of the automatic transmission portion 20 is determined to be zero when the coasting shift-down operation is performed, so that the amount of change of the output torque of the automatic transmission portion 20 upon completion of the coasting shift-down operation can be minimized. Since the shifting operation of the automatic transmission portion 20 is performed when it is determined that the input torque $T_{IN}$ is zero, as described above, the amount of change of the input torque $T_{IN}$ of the automatic transmission portion 20 upon the shifting operation is reduced, so that the shifting shock is reduced.

The present embodiment is further configured to provide the predetermined value of the regenerative torque of the second electric motor M2 used to determine whether the input torque $T_{IN}$ of the automatic transmission portion 20 is zero, and to determine whether the input torque $T_{IN}$ of the automatic transmission portion 20 is zero, by determining whether the regenerative torque is equal to the predetermined regenerative torque value. Thus, the determination as to whether the input torque $T_{IN}$ of the automatic transmission portion 20 is zero can be adequately made. Accordingly, the coasting shift-down operation of the automatic transmission portion 20 can be adequately performed when the input torque $T_{IN}$ of the automatic transmission portion 20 is zero.

The present embodiment is further configured to implement the shifting synchronization control to place the power transmitting path through the automatic transmission portion 20 in the power cut-off state during a process of shifting operation of the transmission portion 20, and to control the second electric motor M2 for controlling the rotating speed of the input-side rotary member of the automatic transmission portion 20 (rotating speed of the power transmitting member 18) to the synchronous speed value to be established after the shifting operation. Unlike the clutch-to-clutch shifting control, for example, the shifting synchronization control (synchronous control of the second electric motor torque $T_{M2}$, for instance) prevents a change of the input torque $T_{IN}$ of the automatic transmission portion 20 from influencing the output torque in the process of the shifting operation, and is comparatively easily implemented to perform the shifting operation of the automatic transmission portion 20. In addition, the amount of change of the output torque of the automatic transmission portion 20 upon completion of the coasting shift-down operation performed under the shifting synchronization control can be minimized, so that the shifting shock can be minimized.

The present embodiment is further configured to implement the shifting control to perform the shifting operation of the automatic transmission portion 20 under the condition of an improvement of the fuel economy rather than the determination that the input torque $T_{IN}$ of the automatic transmission portion 20 is zero, when the target vehicle deceleration value $G^*$ is larger than the predetermined value (predetermined target vehicle deceleration threshold value $G^{*'}$). Thus, the control priority is given to the fuel economy, to improve the fuel economy rather than to reduce the shifting shock, when the vehicle deceleration value is relatively large so that the shifting shock is less likely to be felt by the vehicle operator than when the vehicle deceleration value is relatively small.

The present embodiment is further configured to implement the shifting control to perform the shifting operation of the automatic transmission portion 20, so as to maximize the regeneration efficiency of the second electric motor M2 when the target vehicle deceleration value $G^*$ is larger than the predetermined value. Accordingly, the shifting operation of the automatic transmission portion 20 is adequately performed under the condition of the improvement of the fuel economy.

Another embodiment of this invention will be described next. In the following description, the same reference signs will be used to identify the common elements in the different embodiments.

Embodiment 2

In the preceding embodiment, the determination as to whether the input torque $T_{IN}$ of the automatic transmission portion 20 is zero is made on the basis of the determination as to whether the regenerative torque of the second electric motor M2 is equal to the predetermined value. In the present embodiment, the determination as to whether the input torque $T_{IN}$ of the automatic transmission portion 20 is zero or not is made on the basis of a determination as to whether a point representative of the actual running state of the vehicle coincides with a predetermined shifting point at which the shifting operation of the automatic transmission portion 20 should be performed while the input torque $T_{IN}$ of the automatic transmission portion 20 is zero. Namely, a coasting shift-down point at which the coasting shift-down operation of the automatic transmission portion 20 should be performed while the input torque $T_{IN}$ of the automatic transmission portion 20 is zero is predetermined so that the coasting shift-down operation of the automatic transmission portion 20 is performed at the predetermined coasting shift-down point. As described above, however, if the coasting shift-down vehicle speed point at which the coasting shift-down operation is performed is uniformly selected at the value $V0$ (indicated in FIG. 10) at which the input torque $T_{IN}$ of the automatic transmission portion 20 is zero or substantially zero when the brake is off, the shifting shock may be increased when the brake is on. In view of this, the vehicle speed at which the input torque $T_{IN}$ of the automatic transmission portion 20 is zero while only the generative torque of the second electric motor M2 is used as the vehicle braking torque is predetermined by experimentation, as the normal coasting shift-down point V0 to be used while the brake is off. The coasting shift-down point of the vehicle speed which is used while the brake is on and at which the input torque $T_{IN}$ of the automatic transmission portion 20 is zero is predetermined at a point which is lower than the normal coasting shift-down point V0 by an amount corresponding to an amount of increase of the target vehicle deceleration value G*. For instance, the target vehicle deceleration value G* is achieved by the regenerative torque and the wheel braking torque which have the predetermined proportion. Accordingly, the coasting shift-down point to be used while the brake is on is lowered from the normal coasting shift-down point V0 to be used while the brake is off, by a predetermined amount corresponding to the amount of increase of the target vehicle deceleration value G*. Namely, the regenerative torque increases with an increase of the target vehicle deceleration value G*, so that the coasting shift-down point to be used while the brake is on is accordingly lowered with respect to the point V0, to permit the coasting shift-down operation to be performed at the accordingly small regenerative torque. It is noted that the above-indicated predetermined amount is an amount of reduction of the normal coasting shift-down point V0 which is obtained by experimentation on the basis of the target vehicle deceleration value G* such that the amount of reduction is increased with the amount of increase of the vehicle deceleration value G* so that the input torque $T_{IN}$ of the automatic transmission portion 20 is zeroed even when the target vehicle deceleration value G* is increased.

As previously described on the other hand, the coasting shift-down operation of the automatic transmission portion 20 when the vehicle deceleration value in the vehicle decelerating state is relatively large should be performed so as to attain (give control priority to) an improvement of the fuel economy rather than reduction of the shifting shock. To this end, the present embodiment is configured to lower the coasting shift-down vehicle speed point when the target vehicle deceleration value G* is equal to or larger than the predetermined threshold value, to a high efficiency point obtained by experimentation at which the regeneration efficiency of the second electric motor M2 is maximum, so that the fuel economy is improved rather than the shifting shock is reduced.

Figure 12:
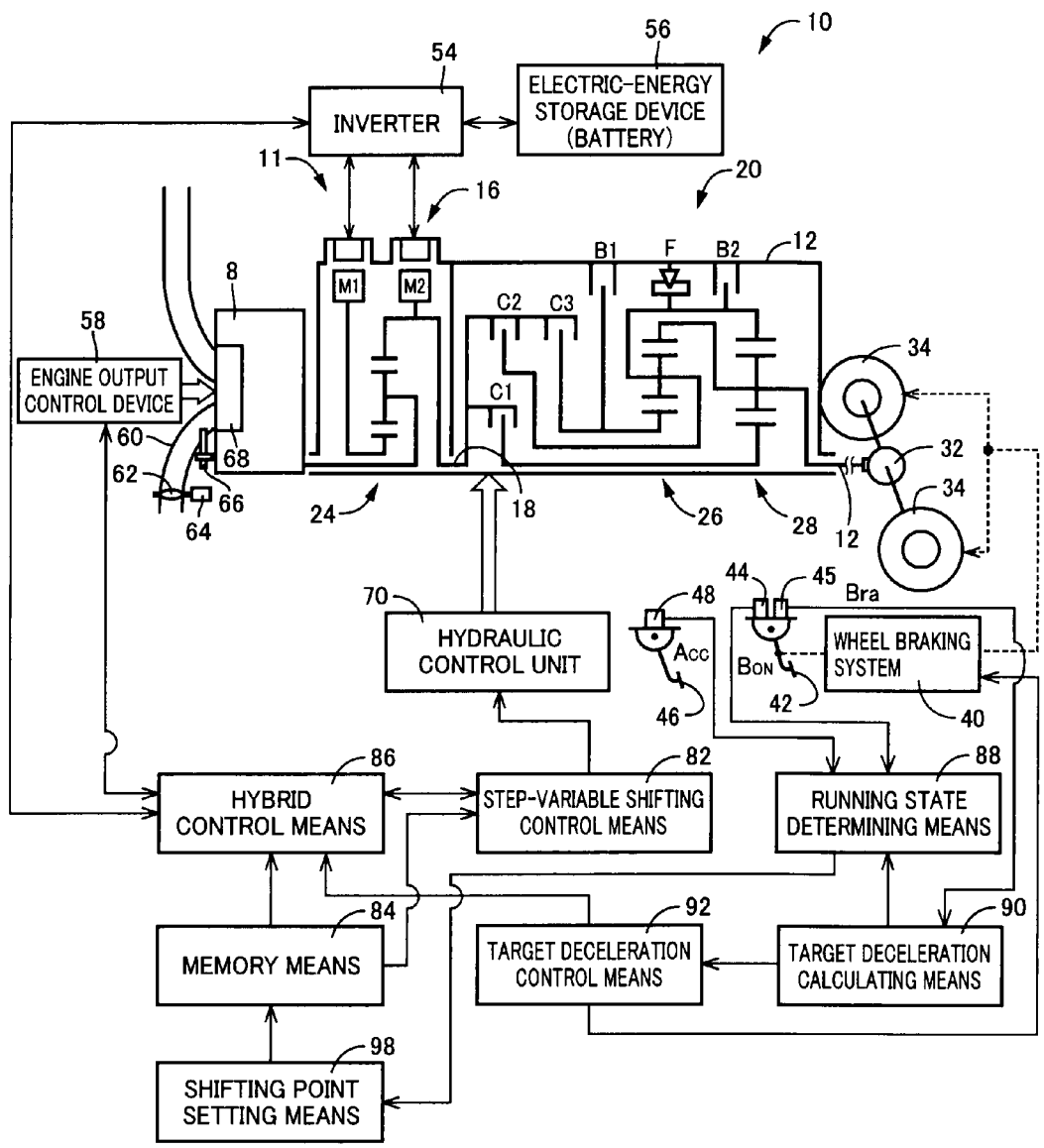
FIG. 12 is a functional block diagram corresponding to that of FIG. 7, illustrating major control functions of the electronic control device of FIG. 4 as modified according to another embodiment of this invention.

Described in detail by reference to the functional block diagram of FIG. 12 corresponding to that of FIG. 7, there are illustrated major control functions of the electronic control device 80. The running state determining means 88 shown therein is further configured to determine whether the target vehicle deceleration value G* after it has been determined that the vehicle is in the decelerating state has increased from the value when the brake is off, that is, whether the negative input torque $T_{IN}$ of the automatic transmission portion 20 has increased from the value when the brake is off. The determination as to whether the target vehicle deceleration value G* has increased may be made by the running state determining means 88, by determining whether the brake has been turned on, on the basis of the brake operation signal $B_{ON}$.

A shifting point setting portion in the form of shifting point setting means 98 is configured to set the coasting shift-down vehicle speed point at the normal coasting shift-down point V0 to be used in the off state of the brake, when the running state determining means 88 has determined that the brake is not on. When the running state determining means 88 has determined that the brake is on and when it has been determined that the target vehicle deceleration value G* is smaller than the predetermined threshold value G*', the shifting point setting means 98 sets the coasting shift-down vehicle speed at the point which is lower than the normal coasting shift-down vehicle speed point V0 by the predetermined amount corresponding to the amount of increase of the target vehicle deceleration value G* from the value when the brake is off. When the running state determining means 88 has determined that the brake is on and when it has been determined that the target vehicle deceleration value G* is equal to or larger than the predetermined threshold value G*', the shifting point setting means 98 sets the coasting shift-down vehicle speed at the high efficiency point at which the regeneration efficiency of the second electric motor M2 is maximum. The coasting shift-down vehicle speed point is changed by the shifting point setting means 98 by selecting one of the coasting shift-down vehicle speed points stored in the memory means 84.

When the running state determining means 88 has determined that the vehicle is in the decelerating state, the step-variable shifting control means 82 determines whether the coasting shift-down operation of the automatic transmission portion 20 should be performed. This determination is made on the basis of the coasting shift-down vehicle speed point set by the shifting point setting means 98, and the actual running state of the vehicle (actual vehicle speed V, for example). The step-variable shifting control means 82 implements the shifting control to perform the coasting shift-down operation of the automatic transmission portion 20 on the basis of a result of the determination.

Figure 13:
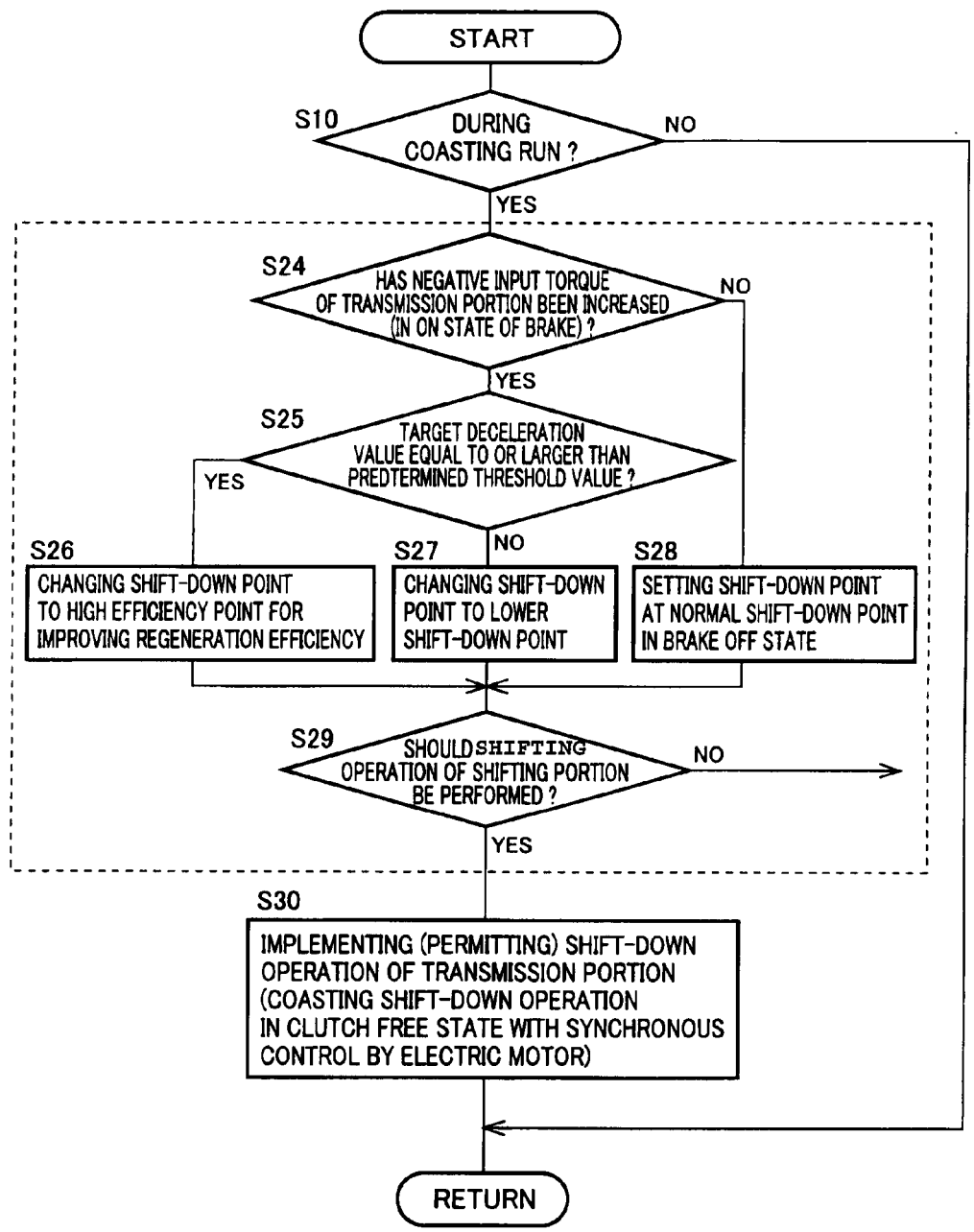
FIG. 13 is a flow chart corresponding to that of FIG. 11, illustrating major control functions of the electronic control device, namely, a control routine executed to reduce the amount of variation of the input torque of the automatic transmission portion in the coasting shift-down operation thereof for thereby reducing the shifting shock of the automatic transmission portion, in the modified embodiment.

FIG. 13 is the flow chart illustrating a major control operation of the electronic control device 80, namely, a control routine executed to reduce the amount of change of the input torque $T_{IN}$ of the automatic transmission portion 20 in the coasting shift-down operation thereof for thereby reducing the shifting shock of the automatic transmission portion 20. This control routine is repeatedly executed with an extremely short cycle time of several msecs. to several tens of msecs. The flow chart in FIG. 13 corresponds to that in FIG. 11. FIGS. 11 and 13 are different each other in operations in portions surrounded by broken lines, respectively.

As illustrated in FIG. 13, S10 corresponding to the running state determining means 88 is initially implemented to determine whether the vehicle is in a decelerating state, namely, in a coasting run, with the accelerator pedal being placed in the off state. This determination is made on the basis of the accelerator pedal operation amount $A_{CC}$. If a negative determination is obtained in S10, the present control routine is terminated. If an affirmative determination is obtained in S10, the control flow goes to S24 also corresponding to the running state determining means 88, to determine whether the negative input torque $T_{IN}$ of the automatic transmission portion 20 has increased with respect to the value when the brake is off. This determination is made by determining whether the brake has been turned on. If an affirmative determination is obtained in S24 when the brake is on, the control flow goes to S25 also corresponding to the running state determining means 88, to determine whether the target vehicle deceleration value G* calculated by the target deceleration calculating means 90 is equal to or larger than the predetermined value, for example, the predetermined threshold value G*'. If an affirmative determination is obtained in S25 when the target vehicle deceleration value G* is equal to or larger than the predetermined threshold value G*', the control flow goes to S26 corresponding to the shifting point setting means 98, to set the coasting shift-down vehicle speed point at the high efficiency point at which the regeneration efficiency of the second electric motor M2, for example, is maximum. If a negative determination is obtained in S25 when the target vehicle deceleration value G* is smaller than the predetermined threshold value G*', the control flow goes to S27 also corresponding to the shifting point setting means 98, to set the coasting shift-down vehicle speed point at the point which is lower than the normal coasting shift-down point V0 by the amount of increase of the target vehicle deceleration value G* as a result of an operation of the brake relative to that in brake-off state. If a negative determination is obtained in S24 when the brake is off, the control flow goes to S28 also corresponding to the shifting point setting means 98, to set the coasting shift-down vehicle speed point at the normal coasting shift-down point V0 to be used when the brake is off.

The S26, S27 and S28 described above are followed by S29 corresponding to the step-variable shifting control portion 82, to determine whether the coasting shift-down operation of the automatic transmission portion 20 should be performed. This determination is made on the basis of the coasting shift-down vehicle speed point set in S26, S27 or S28 and the actual vehicle speed V. If a negative determination is obtained in S29, the present control routine is terminated. If an affirmative determination is obtained S29, the control flow goes to S30 corresponding to the step-variable shifting control means 82 and hybrid control means 86, to perform the coasting shift-down operation of the automatic transmission portion 20 by placing the appropriate clutch in the free state. In the process of the coasting shift-down operation in the free state of the appropriate clutch, the synchronous control of the transmitting-member speed $N_{18}$ is implemented by the second electric motor M2. Thus, while the target vehicle deceleration value G* is relatively small, the determination as to whether the input torque $T_{IN}$ of the automatic transmission portion 20 is zero or not is adequately made on the basis of the preset coasting shift-down vehicle speed point, and the coasting shift-down operation of the automatic transmission portion 20 is adequately performed when it has been determined that the input torque $T_{IN}$ of the automatic transmission portion 20 is zero. Accordingly, the amount of change of the output torque of the automatic transmission portion 20 upon completion of the coasting shift-down operation can be minimized while the target vehicle deceleration value G* is relatively small. While the target vehicle deceleration value G* is relatively large, on the other hand, the determination as to whether the regeneration efficiency of the second electric motor M2 is maximum or not is adequately made on the basis of the preset coasting shift-down vehicle speed point, and the coasting shift-down operation of the automatic transmission portion 20 when the target deceleration value G* is relatively large is adequately performed when the regeneration efficiency of the second electric motor M2 is maximum. Accordingly, while the target vehicle deceleration value G* is relatively large, control priority is given to the improvement of the fuel economy rather than to the reduction of the change of the output torque of the automatic transmission portion 20 upon completion of the coasting shift-down operation of the automatic transmission portion 20.

The present second embodiment described above is configured to implement the shifting control to perform the coasting shift-down operation of the automatic transmission portion 20 under the condition of the determination in the decelerating state of the vehicle that the input torque $T_{IN}$ of the automatic transmission portion 20 including the regenerative torque generated by the second electric motor M2 is substantially zero or zero. Therefore, the input torque $T_{IN}$ of the automatic transmission portion 20 is determined to be zero when the coasting shift-down operation is performed, so that the amount of change of the output torque of the automatic transmission portion 20 upon completion of the coasting shift-down operation can be minimized. Since the shifting operation of the automatic transmission portion 20 is performed when it is determined that the input torque $T_{IN}$ is zero, as described above, the amount of change of the input torque $T_{IN}$ of the automatic transmission portion 20 upon the shifting operation is reduced, so that the shifting shock is reduced.

The present second embodiment is further configured to provide a predetermined shifting point at which the coasting shift-down operation of the automatic transmission portion 20 should be performed while the input torque $T_{IN}$ of the automatic transmission portion 20 is zero, and to determine whether the input torque $T_{IN}$ of the automatic transmission portion 20 is zero, by determining whether the point representative of the vehicle speed coincides with the predetermined coasting shift-down vehicle speed point. Thus, the determination as to whether the input torque $T_{IN}$ of the automatic transmission portion 20 is zero is adequately made, so that the coasting shift-down operation of the automatic transmission portion 20 is adequately performed when the input torque $T_{IN}$ of the automatic transmission portion 20 is zero.

The second embodiment is further configured to set the coasting shift-down vehicle speed point at which the input torque $T_{IN}$ of the automatic transmission portion 20 is zero, such that the normal coasting shift-down vehicle speed point V0 to be used when only the regenerative torque generated by the second electric motor M2 is applied to the vehicle is lowered by an amount corresponding to an amount of increase of the target vehicle deceleration value G*. Accordingly, the coasting shift-down operation of the automatic transmission portion 20 is more adequately performed when the input torque $T_{IN}$ of the automatic transmission portion 20 is zero.

The present embodiment is further configured to implement the shifting control to perform the shifting operation of the automatic transmission portion 20 under the condition of an improvement of the fuel economy rather than the determination that the input torque $T_{IN}$ of the automatic transmission portion 20 is zero, when the target vehicle deceleration value G* is larger than the predetermined value (predetermined target vehicle deceleration threshold value G*'). Thus, the control priority is given to the fuel economy, to improve the fuel economy rather than to reduce the shifting shock, when the vehicle deceleration value is relatively large so that the shifting shock is less likely to be felt by the vehicle operator than when the vehicle deceleration value is relatively small.

The present second embodiment is further configured to implement the shifting control to perform the coasting shift-down operation of the automatic transmission portion 20 at the high efficiency shift-down vehicle speed point at which the regeneration efficiency of the second electric motor M2 is maximum, while the target vehicle deceleration value G* is equal to or larger than the predetermined threshold value. Accordingly, the shifting operation of the automatic transmission portion 20 is adequately performed under the condition of an improvement of the fuel economy.

While the embodiments of this invention have been described in detail by reference to the drawings, it is to be understood that the illustrated embodiments may be combined together, and that the invention may be otherwise embodied.

In the illustrated embodiments, the output torque $T_{OUT}$ of the automatic transmission portion 20, which has been transmitted through the automatic transmission portion 20 when the dragging torque in the automatic transmission portion 20 is zero, is used as the input torque $T_{IN}$ of the automatic transmission portion 20. Where the dragging torque in the automatic transmission portion 20 is not zero, the dragging torque should be taken into account in determining whether the input torque $T_{IN}$ of the automatic transmission portion 20 (that is, the output torque $T_{OUT}$ of the automatic transmission portion 20 which has been transmitted through the automatic transmission portion 20) is zero.

In the illustrated embodiments, the shifting synchronization control is implemented in the clutch free state during the coasting shift-down operation of the automatic transmission portion 20 in the vehicle decelerating state. However, the coasting shift-down operation of the automatic transmission portion 20 may be performed in the clutch-to-clutch shifting fashion.

In the illustrated embodiments, the determination as to whether the control priority should be given to the improvement of the fuel economy than to the reduction of the shifting shock is made by determining whether the target vehicle deceleration value G* is equal to or larger than the predetermined threshold value G*'. However, the above-indicated determination may be made by determining whether the brake operation amount Bra is equal to or larger than a predetermined value.

In the illustrated embodiments, the input torque $T_{IN}$ of the automatic transmission portion 20 in the vehicle decelerating state is considered to be primarily the regenerative torque generated by the second electric motor M2. However, the input torque $T_{IN}$ may be considered to be a sum of the regenerative torque and an engine friction torque generated according to an input limit amount Win of the electric-energy storage device 56 in the vehicle decelerating state. Although the engine friction torque is usually a negative torque, the engine friction torque is a positive creep torque at a low speed of the vehicle, so that this positive engine friction torque should be taken into account in determining whether the input torque $T_{IN}$ of the automatic transmission portion 20 is zero.

The vehicular power transmitting system 10 in the illustrated embodiments is provided with the vehicle drive power source in the form of the engine 8 and the second electric motor M2, the electric transmission in the form of the differential portion 11, and the mechanical transmission in the form of the automatic transmission portion 20. However, the present invention is equally applicable to a vehicular power transmitting system provided with at least a transmission portion having a plural of speed ratios to be established in steps, and an electric motor operatively connected to an input-side rotary member of that transmission portion. For instance, the vehicular power transmitting system may be configured such that the electric motor is connected through the transmission portion to the power transmitting member 18 which is the output rotary member of the differential portion 11. The transmission portion may be any other type of power transmitting device (transmission) such as an automatic transmission of a constant-meshing parallel two-axes configuration well known in the field of manual transmissions, which is automatically shifted to selected gear positions by means of select cylinders and shift cylinders.

Although the differential portion 11 in the illustrated embodiments functions as an electrically controlled continuously variable transmission the speed ratio γ0 of which is continuously variable from the minimum value $γ0_{min}$ to the maximum value $γ0_{max}$, with the operating state of the first electric motor M1 being controlled, the differential portion 11 may be modified such that its speed ratio γ0 is not variable continuously, but is variable in steps by utilizing its differential function.

While the engine 8 and the differential portion 11 are connected directly to each other in the power transmitting system 10 in the illustrated embodiments, the engine 8 may be connected to the differential portion 11 through a clutch or other coupling device.

In the power transmitting system 10 in the illustrated embodiments, the first electric motor M1 and the second rotary element RE2 are connected directly to each other, while the second electric motor M2 and the third rotary element RE3 are connected directly to each other. However, the first electric motor M1 may be connected to the second rotary element RE2 through a clutch or any other coupling element, while the second electric motor M2 may be connected to the third rotary element RE3 through a clutch or any other coupling element.

In the illustrated embodiments, the differential portion 11 and the automatic transmission portion 20 are disposed in this order in the direction of power transmission from the engine 8 toward the drive wheels 34. However, the automatic transmission 20 and the differential portion 11 are disposed in this order in the direction of power transmission from the engine 8 toward the drive wheels 34. That is, the automatic transmission portion 20 is required to constitute a portion of the power transmitting path between the engine 8 and the drive wheels 34, and to be arranged such that its input-side rotary element is operatively connected to the electric motor and the engine 8.

In the illustrated power transmitting system 10 in FIG. 1, the differential portion 11 and the automatic transmission portion 20 are connected in series to each other. However, the control apparatus according to the present invention is equally applicable to a power transmitting system in which the differential portion 11 and the automatic transmission portion 20 are not mechanically independent of each other, provided the power transmitting system 10 as a whole is capable of electrically changing its differential state, having an electric differential function and a function of changing its speed ratio in a manner different from that of the electric differential function.

While the power distributing mechanism 16 in the illustrated embodiments is constituted by the planetary gear set of a single-planetary type, it may be constituted by a planetary gear set of a double-planetary type.

The power distributing mechanism 16 provided as a differential mechanism in the illustrated embodiments may be replaced by a differential gear device wherein a pinion rotated by the engine, and a pair of bevel gears meshing with the pinion are operatively connected to the first electric motor M1 and the power transmitting member 18 (second electric motor M2), for example.

In the differential-portion planetary gear set 24 in the illustrated embodiments, the first rotary element RE1 is operatively connected to the engine 8, and the second rotary element RE2 is operatively connected to the first electric motor M1, while the third rotary element RE3 is connected to the power transmitting path to the drive wheels 34. According to the invention, however, the differential-portion planetary gear set 24 may be replaced by a planetary gear device which includes two or more planetary gear sets having respective rotary elements connected to each other and rotary elements respectively operatively connected to the engine, electric motor and drive wheels, and which is switchable between a step-variable shifting state and a continuously-variable shifting state by controlling clutches and brakes connected to the rotary elements of the planetary gear sets.

In the illustrated embodiments, the second electric motor M2 is connected directly to the power transmitting member 18. However, the second electric motor M2 need not be connected directly to the power transmitting member, and may be connected to the power transmitting member 18 indirectly through a transmission, a planetary gear set or a coupling device.

In the power distributing mechanism 16 in the illustrated embodiments, the differential-portion carrier CA0 is fixed to the engine 8, and the differential-portion sun gear S0 is fixed to the first electric motor M1 while the differential-portion ring gear R0 is fixed to the power transmitting member 18. However, this arrangement is not essential. The engine 8, first electric motor M1 and power transmitting member 18 may be fixed to any other elements selected from the three elements CA0, S0 and R0 of the planetary gear set 24.

While the engine 8 is directly fixed to the input shaft 14 in the illustrated embodiments, the engine 8 may be operatively connected to the input shaft 14 through any suitable member such as gears and a belt, and need not be disposed coaxially with the input shaft 14.

In the illustrated embodiments, the first electric motor M1 and the second electric motor M2 are disposed coaxially with the input shaft 14, and the first electric motor M1 is connected to the differential-portion sun gear S0 while the second electric motor M2 is connected to the power transmitting member 18. However, this arrangement is not essential. For instance, the first and second electric motors M1, M2 may be respectively connected to the differential-portion sun gear S0 and the power transmitting member 18, through gears, belts or speed reducing devices.

In the illustrated embodiments, the automatic transmission portion 20 is connected in series to the differential portion 11 through the power transmitting member 18. However, the automatic transmission portion 20 may be disposed coaxially with a counter shaft disposed parallel to the input shaft 14. In this case, the differential portion 11 and the automatic transmission portion 20 are connected to each other in a power transmissive manner through a pair of power transmitting members such as a pair of counter gears, or sprockets and a chain.

The power distributing mechanism 16 in the illustrated embodiments is constituted by one differential-portion planetary gear set 24, the power distributing mechanism may be constituted by two or more planetary gear sets, so that the power distributing mechanism functions as a transmission having three or more speed ratios in its non-differential state (fixed-speed-ratio shifting state).

In the illustrated embodiments, the second electric motor M2 is connected to the power transmitting member 18 which constitutes a part of the power transmitting path between the engine 8 and the drive wheels 34. However, the second electric motor M2 which is connected to the above-indicated power transmitting path may be connectable to the power distributing mechanism 16 through a clutch or any other coupling device, so that the differential state of the power distributing mechanism 16 can be controlled by controlling the operating state of the second electric motor M2 rather than the first electric motor M1 in the power transmitting system 10.

In the illustrated embodiments, the differential portion 11 is provided with the first and second electric motors M1, M2. However, the first and second electric motors M1, M2 may be provided in the power transmitting system 10, such that the motors M1, M2 are disposed outside or separately from the differential portion 11.

The differential portion 11 in the illustrated embodiments may be provided with a differential limiting device which is disposed in the power transmitting mechanism 16 and which is configured to limit the differential function of the differential portion 11 for enabling the differential portion 11 to function also as a step-variable transmission having at least two forward drive positions.

The hydraulically operated frictional coupling devices such as the first and second clutches C1, C2 used in the illustrated embodiments may be replaced by magnetic-power type, electromagnetic type or mechanical type coupling devices such as powder (magnetic powder) clutches, electromagnetic clutches or meshing type dog clutches. Where the electromagnetic clutches are used, the hydraulic control unit 70 having the hydraulic circuit switching valves is replaced by an electric or electromagnetic switching device for controlling a signal circuit for generating electric commands to be applied to the electromagnetic clutches.

The plurality of embodiments described above may be combined together, with priority given to selected features, for example.

It is to be understood that the embodiments have been described for illustrative purpose only, and that the present invention may be embodied with various other changes and improvements which may occur to those skilled in the art.

NOMENCLATURE OF ELEMENTS

8: Engine
10: Vehicular power transmitting system
11: Differential portion
16: Power distributing mechanism (Differential mechanism)
18: Power transmitting member (Input-side rotary member of transmission portion)
20: Automatic transmission portion (Transmission portion)
34: Drive wheels (Vehicle wheels)
40: Wheel braking system (Braking device)
80: Electronic control device (Control apparatus)
M1: First electric motor (Differential electric motor)
M2: Second electric motor (Electric motor)

The invention claimed is:

1. A control apparatus for a power transmitting system of a vehicle provided with a transmission portion having a plurality of speed ratios to be established in steps, and an electric motor operatively connected to an input-side rotary member of said transmission portion and controlled to generate a regenerative torque in a decelerating state of the vehicle, wherein:

the control apparatus being provided with a predetermined value of said regenerative torque in order to determine whether an input torque of said transmission portion is substantially zero;

the control apparatus configured to determine whether the input torque of said transmission portion is substantially zero, on the basis of determining whether said regenerative torque is equal to said predetermined value;

the control apparatus configured to determine whether a control priority for permitting a shift-down operation is given to a fuel economy improving control or to a shifting shock reducing control;

the control apparatus being provided with a predetermined threshold value of a target deceleration value of the vehicle, wherein if the target deceleration value of the vehicle is smaller than the predetermined threshold value then control priority is given to the shifting shock reducing control, and wherein if the target deceleration value is larger than the predetermined threshold value then the control priority is given to the fuel economy improving control;

the control apparatus configured to perform the shifting operation when the control priority is given to the shifting shock reducing control and the input torque of said transmission portion including said regenerative torque is substantially zero during the decelerating state of the vehicle; and the control apparatus configured to perform the shifting operation when the control priority is given to the fuel economy improving control and a regeneration efficiency of said electric motor is maximized.

2. The control apparatus according to claim 1, wherein the control apparatus implements a shifting synchronization control to place said transmission portion in a power cut-off state, and controls a rotating speed of the input-side rotary member of said transmission portion to synchronize with a rotating speed after a shifting operation by said electric motor, during a shifting process of the transmission portion.

3. The control apparatus according to claim 2, wherein said transmission portion is a step-variable transmission having speed ratios to be mechanically established.

4. The control apparatus according to claim 2, wherein the power transmitting system is further provided with a differential portion operatively connected to an engine, and said transmission portion constitutes a portion of a power transmitting path between said engine and drive wheels.

5. The control apparatus according to claim 4, wherein said transmission portion is a step-variable transmission having speed ratios to be mechanically established.

6. The control apparatus according to claim 4, wherein said differential portion has a differential mechanism operatively connected to said engine, and a differential-portion electric motor operatively connected to said differential mechanism, and is operable as an electric continuously-variable transmission, with a differential state of said differential mechanism being controlled by controlling an operating state of said differential-portion electric motor.

7. The control apparatus according to claim 6, wherein said transmission portion is a step-variable transmission having-speed ratios to be mechanically established.

8. The control apparatus according to claim 1, wherein the power transmitting system is further provided with a differential portion operatively connected to an engine, and said transmission portion constitutes a portion of a power transmitting path between said engine and drive wheels.

9. The control apparatus according to claim 8, wherein said transmission portion is a step-variable transmission having speed ratios to be mechanically established.

10. The control apparatus according to claim 8, wherein said differential portion has a differential mechanism operatively connected to said engine, and a differential-portion electric motor operatively connected to said differential mechanism, and is operable as an electric continuously-variable transmission, with a differential state of said differential mechanism being controlled by controlling an operating state of said differential-portion electric motor.

11. The control apparatus according to claim 10, wherein said transmission portion is a step-variable transmission having speed ratios to be mechanically established.

12. The control apparatus according to claim 1, wherein said transmission portion is a step-variable transmission having speed ratios to be mechanically established.

13. The control apparatus according to claim 1, wherein the control apparatus determines that the vehicle is in the decelerating state when an accelerator pedal is placed in an off state.

14. The control apparatus according to claim 1, wherein the control apparatus determines that the regeneration efficiency is maximized if a vehicle speed is equal to a predetermined vehicle speed or if a speed of the electric motor is equal to a predetermined motor speed.

* * * * *